(12) United States Patent
Seitz et al.

(10) Patent No.: US 10,795,341 B2
(45) Date of Patent: Oct. 6, 2020

(54) CONTROL SYSTEM FOR CONTROLLING OPERATION OF A NUMERICALLY CONTROLLED MACHINE TOOL, AND BACK-END AND FRONT-END CONTROL DEVICES FOR USE IN SUCH SYSTEM

(71) Applicants: DMG MORI AKTIENGESELLSCHAFT, Bielefeld (DE); DMG MORI CO., LTD., Yamatokoriyama-shi, Nara (JP)

(72) Inventors: Reinhold Seitz, Hopferau (DE); Dominic Schindler, Lauterach (AT); Peter Pruschek, Pfronten (DE)

(73) Assignees: DMG MORI AKTIENGESELLSCHAFT, Bielefeld (DE); DMG MORI CO., LTD., Yamatokoriyama-shi (JP)

( * ) Notice: Subject to any disclaimer, the term of this patent is extended or adjusted under 35 U.S.C. 154(b) by 871 days.

(21) Appl. No.: 14/909,321

(22) PCT Filed: Jul. 30, 2013

(86) PCT No.: PCT/EP2013/065989
§ 371 (c)(1),
(2) Date: Feb. 1, 2016

(87) PCT Pub. No.: WO2015/014390
PCT Pub. Date: Feb. 5, 2015

(65) Prior Publication Data
US 2016/0179085 A1 Jun. 23, 2016

(51) Int. Cl.
*G05B 19/414* (2006.01)
(52) U.S. Cl.
CPC .. *G05B 19/414* (2013.01); *G05B 2219/31113* (2013.01); *G05B 2219/34303* (2013.01); *G05B 2219/36231* (2013.01)

(58) Field of Classification Search
None
See application file for complete search history.

(56) References Cited

U.S. PATENT DOCUMENTS

| 5,844,804 | A | * | 12/1998 | Schussler | ........... | G05B 19/4145 |
| | | | | | | 700/169 |
| 5,963,444 | A | * | 10/1999 | Shidara | ................ | G05B 19/052 |
| | | | | | | 700/7 |

(Continued)

FOREIGN PATENT DOCUMENTS

| FR | 2 797 332 A1 | 2/2001 |
| FR | 2 950 448 A1 | 3/2011 |

(Continued)

OTHER PUBLICATIONS

Xu, "Application of PLC in Computer Numerical Control Machine", 2015, Published by Altantis Press, pp. 197-201.*

(Continued)

*Primary Examiner* — Doon Y Chow
*Assistant Examiner* — Phuong N Hoang
(74) *Attorney, Agent, or Firm* — Oliff PLC

(57) ABSTRACT

The present invention relates to a control system for controlling operation of a numerically controlled machine tool (100), the system comprising a back-end control device (300) and a front-end control device (200) communicably connected to the back-end control device (300). The back-end control device (300) comprises a numerical controller (310), a programmable logic controller (320), a first communication interface (330) being communicably connected to the numerical controller (310) and the programmable logic controller (320), and an interface server module (410) of a second communication interface (400) being communicably connected to the first communication interface (330). The front-end control device (200) comprises an interface client module (420a) of the second communication (Continued)

interface (400) being adapted to communicably connect to the interface server module (410), second processing means (210) for executing a second operating system (213), a basic module application (211), and a plurality of control applications (212a-212g), the basic module application (211) being for accessing data in the numerical controller (310) and the programmable logic controller (320) via the one or more interface client modules (420a), the interface server module (410) and the first communication interface (330), a display unit (230) for displaying one or more control screens to a user, an input unit (240) for receiving control input operations from the user, and a first human-machine interface (250) being communicably connected to the display unit (230) and the input unit (240), and including a first graphical user interface (251) for controlling the one or more control screens displayed on the display unit (230) and for processing control input operations of the user.

17 Claims, 9 Drawing Sheets

(56) References Cited

U.S. PATENT DOCUMENTS

| | | | | |
|---|---|---|---|---|
| 6,151,625 | A * | 11/2000 | Swales | G05B 19/05 709/218 |
| 6,243,619 | B1 * | 6/2001 | Inamasu | G05B 19/409 700/172 |
| 8,041,840 | B2 * | 10/2011 | Batke | G05B 19/05 700/83 |
| 8,478,438 | B2 | 7/2013 | Nishibashi | |
| 2001/0003804 | A1 * | 6/2001 | Papadopoulos | G05B 19/05 700/83 |
| 2003/0046436 | A1 * | 3/2003 | Govindaraj | H04L 29/06 709/250 |
| 2004/0073680 | A1 * | 4/2004 | Bauer | H04L 29/06 709/227 |
| 2005/0155043 | A1 * | 7/2005 | Schulz | G05B 15/02 719/328 |
| 2007/0299907 | A1 * | 12/2007 | Deininger | G05B 19/4185 709/203 |
| 2008/0189536 | A1 * | 8/2008 | Mann | G06F 15/177 713/1 |
| 2008/0208475 | A1 * | 8/2008 | Karr | E21B 47/00 702/6 |
| 2010/0083226 | A1 * | 4/2010 | Kowal | G06F 9/451 717/113 |
| 2010/0145484 | A1 * | 6/2010 | Yang | G05B 19/406 700/83 |
| 2012/0089239 | A1 * | 4/2012 | Sentgeorge | G05B 19/4185 700/2 |
| 2014/0245451 | A1 * | 8/2014 | Le Sant | H04L 63/1433 726/25 |

FOREIGN PATENT DOCUMENTS

| | | |
|---|---|---|
| JP | 2002-63083 A | 2/2002 |
| JP | 2002-251208 A | 9/2002 |

OTHER PUBLICATIONS

Apr. 1, 2014 International Search Report issued in International Patent Application No. PCT/EP2013/065989.

Feb. 2, 2016 International Preliminary Report on Patentability issued in International Patent Application No. PCT/EP2013/065989.

Jul. 4, 2017 Office Action issued in Japanese Patent Application No. 2016-530356.

May 4, 2017 Office Action issued in Chinese Patent Application No. 201380078665.8.

May 21, 2019 Office Action issued in Indian Patent Application No. 201637001227.

Jun. 4, 2019 Office Action issued in Japanese Patent Application No. 2018-047764.

Apr. 14, 2020 Office Action issued in Japanese Patent Application No. 2018-047764.

Dec. 23, 2019 Office Action issued in Korean Patent Application No. 10-2016-7005350.

* cited by examiner

CONTROL SYSTEM FOR CONTROLLING OPERATION OF A NUMERICALLY CONTROLLED MACHINE TOOL, AND BACK-END AND FRONT-END CONTROL DEVICES FOR USE IN SUCH SYSTEM

The present invention relates to a control system for controlling operation of a numerically controlled machine tool, the system comprising a back-end control device and a front-end control device communicably connected to the back-end control device. Furthermore, the invention relates to a back-end control device and a front-end control device for use in such system.

BACKGROUND OF THE INVENTION

In the prior art, different vendors such as Siemens, Fanuc, Heidenhein, Mitsubishi, Bosch-Rexrodt are providing control devices (such as CNC units) for controlling operation of a numerically controlled machine tool which may typically comprise a numerical controller (also referred to as NC), a programmable logic controller (also referred to as PLC), first storage means for storing data (NC and/or PLC data), the first storage means comprising one or more PLC registers of the programmable logic controller and one or more NC registers of the numerical controller, first processing means for executing a first operating system on the basis of data stored in the first storage means, and a communication interface utilizing a vendor-specific interface language protocol and a vendor-specific internal NC/PLC communication protocol, and being communicably connected to the numerical controller, the programmable logic controller and the first storage means by means of the internal NC/PLC communication protocol.

Usually, machine tool builders must choose a CNC unit form among plural different CNC units or even plural CNC unit vendors. For example, it may be necessary to select a specific CNC unit according to the customer's requirements and according to the cost performance. On the other hand, machine tool builders are typically trying to put their original or special functions to the CNC units to increase the value-added functions in comparison to functions available for the specific CNC units or to keep common operability for the operation of the machines independent of specific CNC units or CNC unit vendors.

In addition, technical expects for machining are decreasing in the fields of machining industries, and it becomes increasingly difficult to recognize the differences in operation, handling and use of CNC units of different type and vendor and to know the characteristics of each available CNC unit in the market to keep the machining accuracy on a high level.

As any efficient solution for the above problems, it is necessary to provide a common operability for different types of CNC units and different CNC units of different vendors so that the amount of knowledge required for operating CNC units and CNC machine tools is reduced. Specifically, it is desirable to make it easier to operate plural machines by providing common standardized operability devices for CNC control which can be used for all types of CNC units which are themselves not standardized among CNC units and CNC unit vendors. More specifically, it is desirable to provide a common API (application programming interface) for CNC units manufactured by different manufacturers.

SUMMARY OF THE INVENTION

It is an object of the present invention to provide a configuration of a control system for controlling operation of a numerically controlled machine tool which can be commonly applied to a plurality of machine tools of different vendors including NC/PLC control systems of different vendors utilizing different interface language protocols according to which a machine tool or a system of a plurality of machine tools (even comprising machine tools of different vendors and different NC/PLC systems) can be universally and conveniently monitored directly or remotely, and be remotely, universally, efficiently, intuitively, and reliably controlled.

For solving the object of the present invention, according to the present invention, there is proposed a control system for controlling operation of a numerically controlled machine tool according to claim 1, a front-end control device according to claim 17, a back-end control device according to claim 19, and a communication interface according to claim 20. Dependent claims relate to preferred aspects of the present invention.

According to an aspect of the present invention, there may be provided a control system for controlling operation of a numerically controlled machine tool, the system comprising a back-end control device and a front-end control device communicably connected to the back-end control device.

According to an aspect of the present invention, the back-end control device may comprise a numerical controller (also referred to as NC); a programmable logic controller (also referred to as PLC); first storage means for storing data (NC and/or PLC data), the first storage means comprising one or more PLC registers of the programmable logic controller and one or more NC registers of the numerical controller; first processing means for executing a first operating system on the basis of data stored in the first storage means, and/or a first communication interface utilizing a first interface language protocol and an internal NC/PLC communication protocol, and being communicably connected to the numerical controller, the programmable logic controller and the first storage means by means of the internal NC/PLC communication protocol. Such CNC units comprising a numerical controller (NC) and a programmable logic controller (PLC) are typically vendor specific and are provided by plural vendors, each using different interface language protocols and different internal communication protocols. Accordingly, the first interface language protocol is typically vendor specific but may also be a shared protocol used by plural vendors which typically still use different vendor-specific internal NC/PLC communication protocols.

According to an aspect of the present invention, the back-end control device or the front-end control device may comprise an interface server module of a second communication interface utilizing a plurality of interface language protocols including the first interface language protocol (preferably utilizing plural different vendor specific interface protocols as first interface language protocols) and a second interface language protocol, and being communicably connected to the first communication interface by means of the first interface language protocol, the interface server module being configured to convert between the first interface language protocol and one or more or all other interface language protocols of the plurality of interface language protocols, including interface language conversion from the first interface language protocol to the second interface language protocol and from the second interface language protocol to the first interface language protocol. Preferably, this interface language protocol conversion includes interface language protocol conversion between different vendor-specific interface language protocols (as vendor specific first interface language protocols) and the second interface language protocol.

According to an aspect of the present invention, the front-end control device may comprise one or more interface client modules of the second communication interface utilizing the second interface language protocol and/or a second internal communication protocol, and being adapted to communicably connect to the interface server module of the second communication interface by means of the second interface language protocol. This has the advantage that the interface server module and the interface client modules may commonly communicate universally independent of the specific type of the first interface language protocol which may be vendor-specific.

According to an aspect of the present invention, the front-end control device may further comprise second processing means for executing a second operating system, a basic module application, and a plurality of control applications, the basic module application executed on the second processing means being adapted to access data stored in the first storage means via the one or more interface client modules of the second communication interface, the interface server module of the second communication interface, and the first communication interface; and/or the front-end control device may further comprise second storage means for storing data received from the numerical controller, the programmable logic controller and/or the first storage means via the first communication interface, the interface server module of the second communication interface, and the one or more interface client modules of the second communication interface.

According to an aspect of the present invention, the front-end control device may further comprise a display unit for displaying one or more control screens to a user; an input unit for receiving control input operations from the user; and/or a first human-machine interface being communicably connected to the display unit and the input unit, and including a first graphical user interface for controlling the one or more control screens displayed on the display unit and for processing control input operations of the user.

According to the above aspect, it is conveniently and reliably enabled to operate a universal control environment on a front-end control device for very different numerically controlled machines and machine tools independent of vendor-specific NC/PLC systems and independent of vendor specific communication protocols or interface language protocols (first interface language protocols) used in a vendor specific NC/PLC system environment.

According to a preferable aspect of the present invention, the basic module application executed on the second processing means is preferably adapted to request data stored in the first storage means by issuing control commands of the second interface language protocol and/or the second internal communication protocol to the one or more interface client modules, which are preferably adapted to transfer the control commands of the second interface language protocol and/or the second internal communication protocol to the interface server module. This has an advantage that the data retrieval from the NC/PLC can be universally controlled by the basic module application independent of vendor specific NC/PLC systems and independent of vendor specific communication protocols used in a vendor specific NC/PLC system environment.

According to a preferable aspect of the present invention, the interface server module is preferably adapted to convert the received control commands of the second interface language and/or the second internal communication protocol to corresponding control commands of the first interface language protocol, and to preferably transfer the converted control commands of the first interface language protocol to the first communication interface, which is preferably adapted to request the corresponding data from the first storage means upon receipt of the converted control commands of the first interface language protocol. This has an advantage that the control of the NC/PLC can be universally performed by the basic module application independent of vendor specific NC/PLC systems and independent of vendor specific communication protocols used in a vendor specific NC/PLC system environment.

According to an aspect of the present invention, the basic module application may be adapted to control retrieval of new control application data and update data via one or more communication interfaces (e.g. via a web server module and the Internet by wired or wireless data communication), and/or data interfaces of the front-end control device (e.g. via data media drives or USB-ports), and to preferably control installation of one or more new control applications on the basis of retrieved new control application data and/or to preferably control updating of one or more existing control applications based on retrieved update data. This has an advantage that adding new control applications and/or updating existing control applications of the NC/PLC can be universally performed by the basic module application independent of vendor specific NC/PLC systems and independent of vendor specific communication protocols used in a vendor specific NC/PLC system environment.

According to a preferable aspect of the present invention, the control applications executed on the second processing means are preferably communicably connected to the basic module application (e.g. on the basis of the second internal communication protocol) and are preferably enabled to access data stored in the first storage means through the basic module application. This has an advantage that the control of retrieval of data for control applications from the NC/PLC can be universally performed by requesting the data through the basic module application independent of vendor specific NC/PLC systems and independent of vendor specific communication protocols used in a vendor specific NC/PLC system environment.

According to a preferable aspect of the present invention, the control applications executed on the second processing means are preferably communicably connected to the basic module application (e.g. on the basis of the second internal communication protocol), and the basic module application is preferably adapted to store result information and/or statistical information received from one or more control applications into the second storage means.

According to a preferable aspect of the present invention, one or more first control applications of the plurality of control applications executed on the second processing means are preferably adapted to observe data related to one or more second control applications of the plurality of control applications, preferably through the basic module application. This has the advantage that some control applications may directly observe data used or generated by other control applications through the basic module application without the requirement to request data from the NC/PLC system.

According to a preferable aspect of the present invention, one or more first control applications of the plurality of control applications executed on the second processing means are preferably adapted to modify data related to one or more second control applications of the plurality of control applications, preferably through the basic module application. This has the advantage that some control applications may directly modify data used or generated by other control applications through the basic module application without the requirement to request data from the NC/PLC system.

According to a preferable aspect of the present invention, the first human-machine interface is preferably configured to provide a plurality of sets of user operable widgets, each user operable widget being preferably operable by the user via the input unit, wherein the first graphical user interface is preferably configured to control a plurality of first control screens such that each first control screen includes a configuration of a respective set of user operable widgets, the first graphical user interface being preferably configured to switch among one or more first control screens displayed on the display unit on the basis of user input operations input via the input unit. This has an advantage that a convenient graphical user interface for controlling the NC/PLC can be universally provided independent of vendor specific NC/PLC systems and independent of vendor specific communication protocols used in a vendor specific NC/PLC system environment.

According to a preferable aspect of the present invention, the system preferably further comprises a second human-machine interface being preferably adapted to communicably connect to the first communication interface and the first human-machine interface, and preferably including a second graphical user interface for controlling at least one second control screen, the first graphical user interface being preferably further configured to control displaying either one or more first control screens or a third control screen on the display unit, wherein the third control screen preferably includes a part corresponding to the at least one second control screen provided by the second graphical user interface. This has an advantage that a convenient graphical user interface for controlling the NC/PLC can be universally provided, in which vendor specific NC control screens can be conveniently embedded into the control environment, independent of vendor specific NC/PLC systems and independent of vendor specific communication protocols used in a vendor specific NC/PLC system environment.

According to a preferable aspect of the present invention, the first graphical user interface is preferably configured to control the third control screen such that the third control screen preferably further includes a configuration of a respective set of user operable widgets provided by the first human-machine interface. This has the advantage that the third control screen provides full control functionality of the second graphical user interface (vendor-specific) and adds further control functionality by the additional widgets included in the third control screen.

According to a preferable aspect of the present invention, the second graphical user interface is preferably comprised in the front-end control device and preferably being executed on the second processing means. Alternatively, according to another preferable aspect of the present invention, the second graphical user interface is preferably comprised in the back-end control device being executed on the first processing means, and the first and second graphical user interfaces are preferably communicably connected via a graphical desktop sharing system.

According to a preferable aspect of the present invention, the first graphical user interface is preferably further configured to control displaying an application selection screen on the display unit having a set of user-operable application selection widgets, each application selection widget being preferably adapted for enabling selection of one or more of the plural control applications by the user. This has an advantage that a convenient and universal application selection tool can be provided independent of vendor specific NC/PLC systems and independent of vendor specific communication protocols used in a vendor specific NC/PLC system environment.

According to a preferable aspect of the present invention, the first graphical user interface is preferably further configured to control, for each selected control application, displaying a respective application screen (control application screen) for the respective selected control application, each application screen including a set of control application related user-operable widgets.

According to a preferable aspect of the present invention, the input unit and the display unit are preferably integrated into an operation unit comprising a touch user interface including a touch pad or touch screen preferably combining at least parts of the input unit and the display unit. This has an advantage that a convenient and user-friendly intuitive control environment can be provided independent of vendor specific NC/PLC systems and independent of vendor specific communication protocols used in a vendor specific NC/PLC system environment.

According to a preferable aspect of the present invention, the first graphical user interface preferably includes one or more user-operable widgets communicably connected to the basic module application and/or to one or more interface client modules.

According to a preferable aspect of the present invention, the one or more widgets are preferably adapted to access data in the first and second storage means via the basic module application, and/or the one or more preferably widgets are adapted to access data in the first storage means via the one or more interface client modules.

According to a preferable aspect of the present invention, the front-end control device preferably further comprises a web server module adapted to access data in the first storage means via the one or more interface client modules.

According to a preferable aspect of the present invention, the first graphical user interface preferably includes a first web browser module communicably connected to the web server module.

According to a preferable aspect of the present invention, the system further comprises a first remote control device including a second web browser module, a second display unit for displaying one or more control screens to a user, and a second input unit for receiving control input operations from the user, wherein the second web browser module is preferably adapted to communicably connect to the to the web server module of the front-end control device and to preferably access the second storage means and the basic module application of the front-end control device via the web server module, and to preferably access the first storage means, the numerical controller and the programmable logic controller of the back-end control device via the web server module, the one or more interface client modules, the interface client server and the first communication interface, and wherein the second display unit is preferably configured to display the one or more control screens provided by the first graphical user interface via a graphical desktop sharing system. This has an advantage that a convenient and universal remote control functionality, e.g. from an external device such as a mobile device (e.g. a notebook or laptop, a tablet or a mobile phone such as smartphone), can be provided independent of vendor specific NC/PLC systems and independent of vendor specific communication protocols used in a vendor specific NC/PLC system environment.

According to a preferable aspect of the present invention, the system further comprises a second remote control device including a processing means (processing unit), a remote application being executed in the processing means, and a third graphical user interface for providing an remote application screen on the basis of the execution of the remote application, wherein the third graphical user interface is preferably communicably connected with the first graphical user interface of the front-end control device, and the first graphical user interface is preferably adapted to control displaying the remote application screen on the first display unit of the front-end control device via a graphical desktop sharing system. This has an advantage that a convenient and universal monitoring functionality and/or a remote maintenance functionality, e.g. from an external device such as a remote computer or mobile device (e.g. a notebook or laptop, a tablet or a mobile phone such as smartphone), can be provided independent of vendor specific NC/PLC systems and independent of vendor specific communication protocols used in a vendor specific NC/PLC system environment.

According to a preferable aspect of the present invention, the system further comprises a data collection device comprising an interface client module preferably communicably connected to the database storage device and utilizing the second interface language protocol and preferably being communicably connectable with one or more interface server modules of one or more front-end or back-end control devices, the data collection device being preferably configured to access data in storage means of the one or more back-end control devices via the interface client module and the respective interface server modules and first communication modules of the respective back-end control devices, wherein the data collection device preferably comprises a database storage means for storing history data received from the one or more front-end or back-end control devices via the interface client module.

According to an aspect of the present invention, there may be provided a front-end control device for use in a system according to any of the preceding aspects. Such front-end control device may comprise one or more interface client modules of the second communication interface utilizing the second interface language protocol and/or a second internal communication protocol, and being adapted to communicably connect to the interface server module of the second communication interface by means of the second interface language protocol; second processing means for executing a second operating system, a basic module application, and a plurality of control applications, the basic module application executed on the second processing means (second processing unit) being adapted to access data stored in the first storage means via the one or more interface client modules of the second communication interface, the interface server module of the second communication interface, and the first communication interface; second storage means for storing data received from the numerical controller, the programmable logic controller and the first storage means via the first communication interface, the interface server module of the second communication interface, and the one or more interface client modules of the second communication interface; a display unit for displaying one or more control screens to a user; an input unit for receiving control input operations from the user; and/or a first human-machine interface being communicably connected to the display unit and the input unit, and including a first graphical user interface for controlling the one or more control screens displayed on the display unit and for processing control input operations of the user.

According to a preferred aspect, the front-end control device may comprise an interface server module of a second communication interface utilizing a plurality of interface language protocols including the first interface language protocol and the second interface language protocol, and being communicably connected to the first communication interface by means of the first interface language protocol, the interface server module being configured to convert between the first interface language protocol and one or more or all other interface language protocols of the plurality of interface language protocols, including interface language conversion from the first interface language protocol(s) to the second interface language protocol and from the second interface language protocol to the first interface language protocol(s).

According to an aspect of the present invention, there may be provided a back-end control device for use in a system according to any of the preceding aspects, comprising a numerical controller; a programmable logic controller; first storage means for storing data, the first storage means comprising one or more PLC registers of the programmable logic controller and one or more NC registers of the numerical controller; first processing means for executing a first operating system on the basis of data stored in the first storage means; a first communication interface utilizing a first interface language protocol and an internal NC/PLC communication protocol, and being communicably connected to the numerical controller, the programmable logic controller and the first storage means by means of the internal NC/PLC communication protocol; and/or an interface server module of a second communication interface utilizing a plurality of interface language protocols including the first interface language protocol and the second interface language protocol, and being communicably connected to the first communication interface by means of the first interface language protocol, the interface server module being configured to convert between the first interface language protocol and one or more or all other interface language protocols of the plurality of interface language protocols, including interface language conversion from the first interface language protocol(s) to the second interface language protocol and from the second interface language protocol to the first interface language protocol(s).

According to an aspect of the present invention, there may be provided a communication interface for use in a system according to any of the preceding aspects, comprising an interface server module utilizing a plurality of interface language protocols including one or more first interface language protocols and the second interface language protocol, and being communicably connectable to the first communication interfaces of one or more NC/PLC back-end control devices by means of the one or more first interface language protocols utilized by the first communication interfaces; and/or one or more interface client modules utilizing the second interface language protocol and/or a second internal communication protocol, and being adapted to communicably connect to the interface server module by means of the second interface language protocol.

Features, components and specific details of the structures of the above-described aspects may be exchanged or combined to form further aspects optimized for the respective application. As far as those modifications are readily apparent for an expert skilled in the art they shall be disclosed implicitly by the above description without specifying explicitly every possible combination, for the sake of conciseness of the present description.

DETAILED DESCRIPTION OF EXEMPLARY EMBODIMENTS

Preferred embodiments of the present invention will be described below with reference to the accompanying figures. The described features and aspects of the embodiments may be modified or combined to form further embodiments of the present invention.

Figure 1:
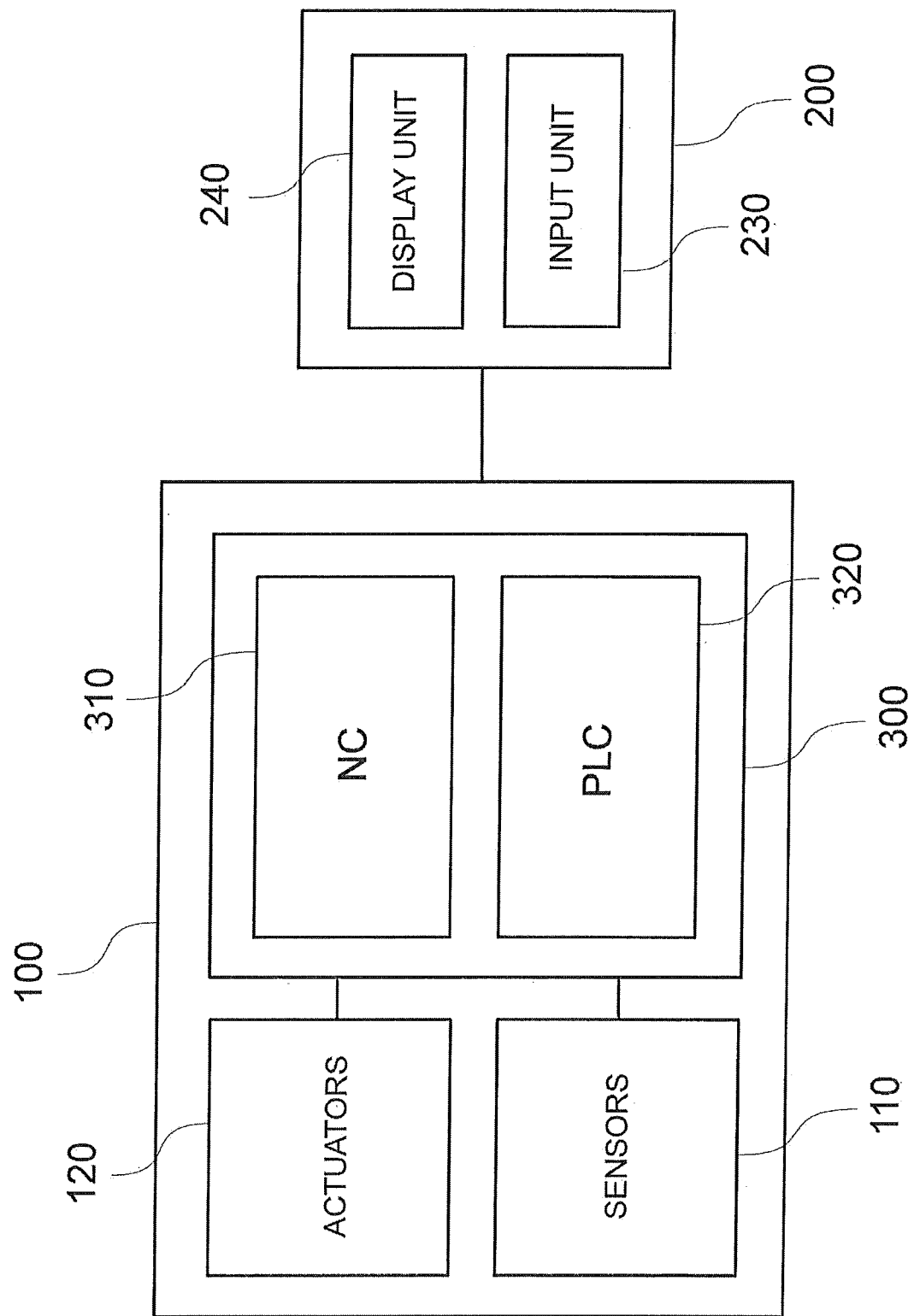
FIG. 1 shows an exemplary schematic structure of a control system according to an embodiment of the present invention.

FIG. 1 shows an exemplary schematic structure of a control system according to an embodiment of the present invention. The control system is suitable for controlling (and/or monitoring) operation of a numerically controlled machine tool 100 which generally comprises actuators 120 (such as axis drive actuators, spindle drive actuators, tool exchange actuators, workpiece/pallet exchange actuators, cooling mechanism actuators, chip conveying actuators, etc.) and sensors 110 (such as temperature sensors, vibration sensors, collision sensors, optical sensors, touch sensors, etc.).

In embodiments of the invention, the numerically controlled machine tool 100 may be configured to control relative movement of one or more workpieces with respect to one or more tools by means of a plurality of numerically controlled linear and/or rotary axes, automatic workpiece and/or pallet exchange at the machine tool, automatic tool exchange to/from a tool magazine and/or tool changer etc., and it may be realized, for example, as a milling machine tool, a lathe, a milling/turning machine tool, a turning/milling machine tool, a universal machine tool, and a machining center having four, five or even more controllable axes.

The control system comprises a back-end control device 300, which may be integrated into the cabinet of the machine tool 100 as exemplarily shown in FIG. 1 or into an external operation panel of the machine tool 100, and a front-end control device 200, which may be integrated into the external operation panel of the machine tool 100 as exemplarily shown in FIG. 1 or into the cabinet of the machine tool 100. The front-end control device 200 is communicably connected to the back-end control device 300 via a communication connection (which may be a wired connection or a wireless connection via Bluetooth, WiFi or the like, or which may even combine wired and wireless connection types).

As exemplarily shown in FIG. 1, the back-end control device 300 comprises a numerical controller 310 (in the related art generally referred to as NC) and a programmable logic controller 320 (in the related art generally referred to as PLC), wherein the programmable logic controller 320 is configured to control plural of the actuators 120 of the machine tool 100 on the basis of internal PLC control logics stored in a PLC register or the like, data or signals received from the sensors 110 of the machine tool 120 and/or from the numerical controller 310, and the numerical controller 310 is configured to control plural of the actuators 120 of the machine tool 100 and the programmable logic controller 320 on the basis of user input, manually or automatically generated NC program software, data and signals received from sensors 110 of the machine tool 100.

The front-end control device 200 comprises a display unit 240 for displaying one or more control screens to a user (e.g. an operator of the machine tool 100) and an input unit 230 for receiving control input operations from the user. The display unit 240 comprises at least one screen display means but may additionally include plural screen displays of the same size or different sizes and may further include other display means such as LEDs and/or lamps. The input unit 230 may comprise input means such as one or more touch screens, one or more keypads, one or more pointing devices such as a computer mouse or the like, buttons, keys, communication interfaces such as USB ports, wireless communication interface ports (such as RFID, Wifi, Bluetooth etc.) and serial or parallel communication ports.

In most preferable embodiments of the present invention, at least parts of the display unit 240 and the input unit 230 are integrated into one or more touch screen units which function at the same time so as to be adapted for displaying one or more control screens to the user and for receiving control input operations from the user, in particular, control input operations from the user performed by finger touching.

Preferably, even in embodiments in which the integral components of the front-end control device 200 as exemplarily explained below are mainly integrated into the cabinet of the machine tool 100, at least the display unit 240 and the input unit 230 are preferably still integrated into an external operation unit in the panel of the machine tool 100.

Furthermore, it is to be noted that the back-end control device 300 in embodiments of the invention may comprise vendor-specific NC/PLC control devices which may additionally have their own separate display and input units. So, the present invention is not limited to embodiments in which only the front-end control device has the input and display units 230 and 240, but it is further conceivable that both control devices, i.e. the back-end control device 300 and the front-end control device 200, have respective display and input units.

More detailed configurations of the front-end control device 200 and the back-end control device 300 according to embodiments of the invention shall be described below in connection with FIGS. 2A, 2B, 3A and 3B.

First Embodiment

Figure 2A:
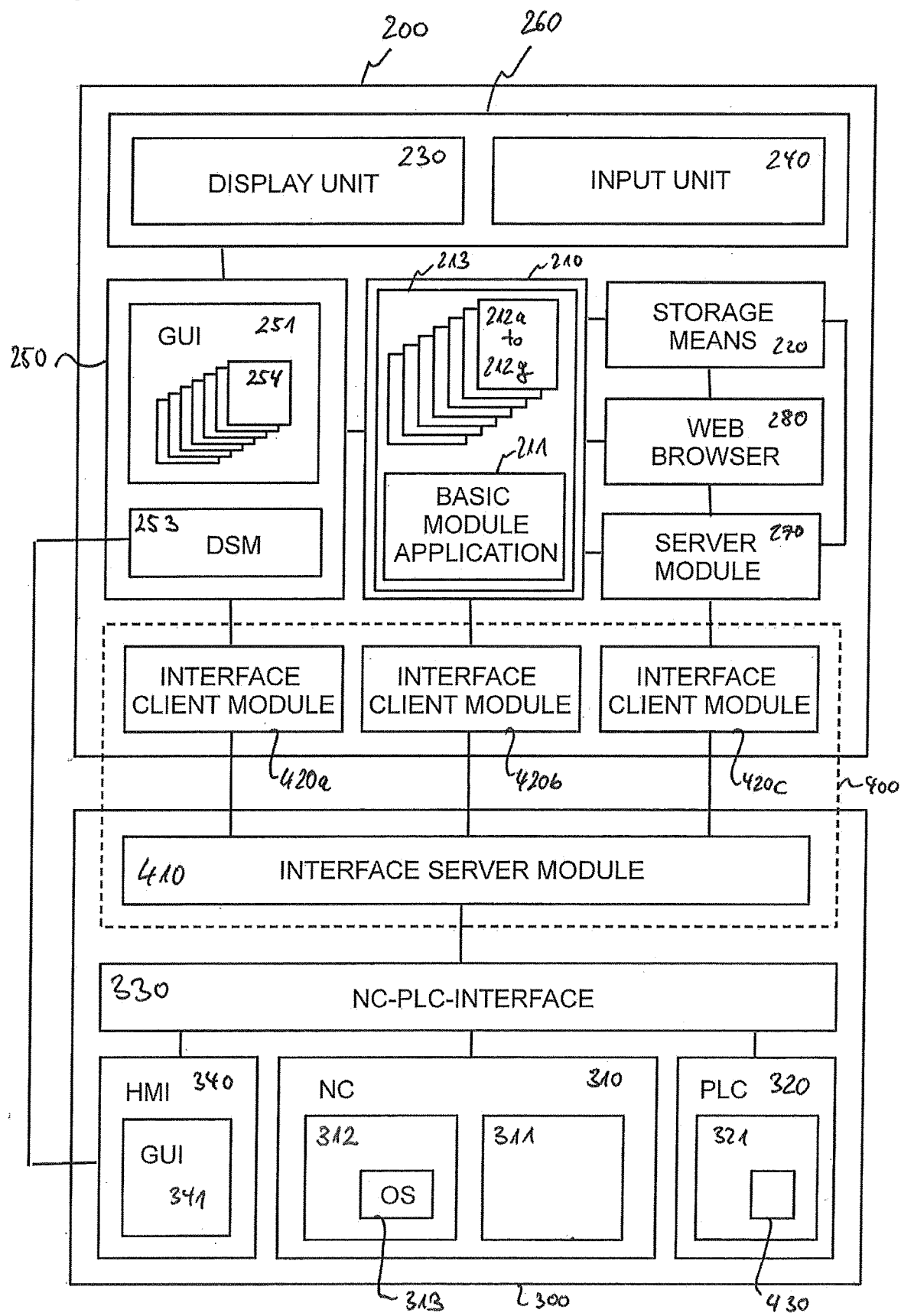
FIG. 2A shows an exemplary schematic configuration of a control system according to a first embodiment of the present invention.

FIG. 2A shows an exemplary schematic configuration of a control system according to a first embodiment of the present invention, including the front-end control device 200 and the back-end control device 300.

As described in connection with FIG. 1, the front-end control device 200 comprises the display unit 230 and the input unit 240, exemplarily integrated into a single operation unit 260 (which may preferably have one or more touch screens combining at least parts of the functions of the display unit 230 and the input unit 240). At least the operation unit 260 may be integrated into the external operation panel of the machine tool 100, and the remaining parts (e.g. an additional computer device having one or more CPUs and being connected to a CNC unit in the back-end control device 300) may be integrated into the cabinet of the machine tool 100, or alternatively the whole front-end control device 200 may be integrated into the external operation panel of the machine tool 100.

On the other hand, the back-end control device 300 comprises the numerical controller 310 (NC) and the programmable logic controller 320 (PLC) as described in connection with FIG. 1. The PLC 320 comprises one or more PLC registers 321 for storing PLC data and the NC 310 comprises one or more NC registers 311 for storing NC data (including manually or automatically generated NC programs and/or parts of manually or automatically generated NC programs). The back-end control device 300 may be integrated into the cabinet of the machine tool 100 or into the external operation panel of the machine tool 100. The NC 310 further comprises processing means 312 (such as one or more CPUs or the like) for processing and/or executing NC programs or parts thereof, and for executing a NC operating system 313. The one or more NC registers 311 and the one or more PLC registers 321 (and optionally further storage means integrated into the NC 310 or directly connected to the NC 310 such as, e.g., disk drives, flash drives, NC-connected USB-sticks, cache memories etc.) may form a first storage means in the sense of the accompanying claims.

The back-end control device 300 in FIG. 2 further comprises a first communication interface module 330 (NC-internal communication interface) which utilizes a first interface language protocol and may further utilize an internal NC/PLC communication protocol, and is communicably connected to the numerical controller 310, the programmable logic controller 321 and the first storage means including the one or more NC registers 311 and the one or more PLC registers 321. Typically, the first communication interface module 330 is configured to communicate with the numerical controller 310, the programmable logic controller 321 and the first storage means including the one or more NC registers 311 and the one or more PLC registers 321 by means of the internal NC/PLC communication protocol and/or the first interface language protocol for transmitting externally received control commands to the NC 310 and/or the PLC 320 or for requesting data from the one or more NC registers 311 and the one or more PLC registers 321 upon external request or by request of the NC 310 and/or the PLC 320. If utilizing the internal NC/PLC communication protocol, the first communication interface 330 is configured to convert between the (vendor-specific) internal NC/PLC communication protocol and (to/from) the (vendor-specific or vendor-group specific) first interface language protocol which is utilized by the first communication interface 330 for external communication.

It is to be noted that the first interface language protocol as well as the internal NC/PLC communication protocol is typically vendor-specific and is dependent on the specific vendor of the NC/PLC system. For example, known first interface language protocols for specific vendors may include "'Object Linking and Embedding'(OLE) for Process Control"—(OPC)-based communication protocols such as from the vendor Bosch-Rexrodt AG, or other vendor-specific communication protocols used for CAP/DDE from Siemens AG, cjh/jh-Module from Heidenhain GmbH, MELDASAPI from Mitsubishi, or FOCAS from Fanuc, Ltd., etc.

Furthermore, the back-end control device 300 comprises a second human-machine interface 340 comprising a second graphical user interface 341. The second human-machine interface 340 is adapted to communicably connect to the first communication interface 330, and the second graphical user interface 341 is adapted for controlling at least one vendor-specific NC control screen (second control screen).

Figure 2B:
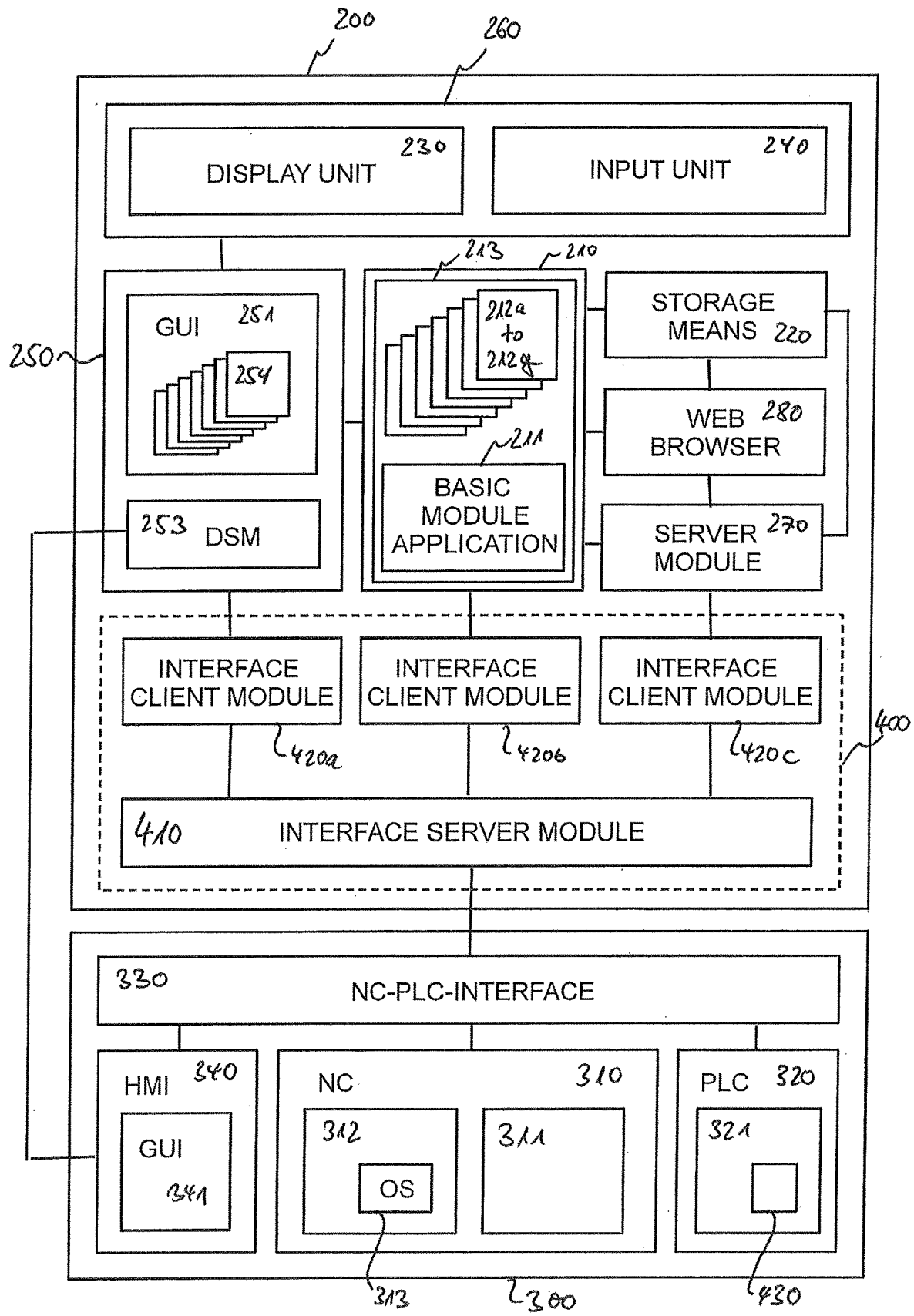
FIG. 2B shows an exemplary schematic configuration of a control system according to a second embodiment of the present invention.

Different from the publically available vendor-specific NC systems, the back-end control device 300 comprises an additional communication interface module which is shown in FIG. 2 as the interface server module 410. It is to be noted that, while the present embodiment describes the interface server module 410 to be provided in the back-end control device 300 containing the NC/PLC, the present invention is not limited to embodiments in which the interface server module 410 is provided in the back-end control device 300, but it is further conceivable that the interface server module 410 is provided in the front-end control device 200 being connected by wired and/or wireless communication connection to the NC-PCL-interface 330 in some embodiments (see e.g. FIGS. 2B and 3B below). It is further conceivable that the interface server module 410 is provided in a separate intermediate device being interconnected between the back-end control device 300 and the front-end control device 200 in some embodiments. The same applies also to the below described embodiments, in which the interface server module 410 may be provided also in the back-end control device 300, the front-end control device 200 or in some intermediate interface device.

The interface server module 410 is part of a second communication interface 400 (indicated by the dashed line in FIG. 2) and is configured to utilize a plurality of interface language protocols (especially a plurality of NC-vendor specific first interface language protocols such as the above-mentioned OPC-based communication protocols such as from the vendor Bosch-Rexrodt AG, or other vendor-specific communication protocols used for CAP/DDE from Siemens AG, cjh/jh-Module from Heidenhain GmbH, MELDASAPI from Mitsubishi, or FOCAS from Fanuc, Ltd., etc) including the first interface language protocol utilized by the first interface 330 and a second interface language protocol.

The interface server module 410 is communicably connected to the first communication interface 330 by means of the first interface language protocol, i.e. the interface server module 410 is adapted to transfer control commands of the first interface language protocol to the first communication interface 330 and/or to receive data or requests from the first communication interface 330 via communication of the first interface language protocol.

Furthermore, the interface server module 410 is configured to convert between the first interface language protocol and all other interface language protocols of the plurality of interface language protocols, including interface language conversion from the first interface language protocol to the second interface language protocol and from the second interface language protocol to the first interface language protocol. Specifically, the interface server module 410 is configured to convert between a plurality of vendor-specific first interface language protocols, e.g. as mentioned above, and (to/from) the second interface language protocol.

In addition, as another part of the second communication interface 400, an data block 430 is provided in the one or more PLC registers 321 in which selected PLC data is registered, wherein the interface server module 410 is directly connected communicably with the one or more PLC registers 321 for read accessing the data of the PLC data block 430 directly without communication exchange with the first communication interface 330 or indirectly via the first communication interface 330.

Another part of the second communication interface 400 is a plurality of interface client modules 420a, 420b and 420c which are comprised in the front-end control device 200 as exemplarily shown in FIG. 2.

Exemplarily, the front-end control device 200 comprises three interface client modules 420a, 420b and 420c of the second communication interface 400, each of which is communicably connected to the interface server module 410 (via wired and/or wireless communication connections).

The interface client modules 420a, 420b and 420c of the second communication interface 400 utilize the second interface language protocol (and may additionally utilize a second internal communication protocol used for internal communications within the system configuration of the front-end control device 200), and the interface client modules 420a, 420b and 420c are adapted to communicably connect to the interface server module 410 of the second communication interface 400 by means of the second interface language protocol.

In case the second internal communication protocol is optionally used for internal communications within the system configuration of the front-end control device 200, the interface client modules 420a, 420b and 420c are configured to convert between the second internal communication protocol and (to/from) the second interface language protocol. Alternatively, or in addition, the interface server module 410 may be configured to convert between the second internal communication protocol and (to/from) the second interface language protocol.

In addition to the above, the front-end control device 200 according to the first embodiment comprises a second storage means 220 for storing data and second processing means 210 for executing a second operating system, a basic module application 211, and a plurality of control applications 212a-212g on the basis of data stored in the second storage means 220.

The basic module application 211 executed on the second processing means 210 is adapted to access data stored in the one or more NC registers 311 and/or data stored in the one or more PLC registers 320 via the interface client module 420b of the second communication interface 400, the interface server module 410 of the second communication interface 400 and the first communication interface 330, and/or the basic module application 211 data stored in the data block 430 of the second communication interface 400 in the one or more PLC registers 320 via the interface client module 420b of the second communication interface 400, and the interface server module 410 of the second communication interface 400.

Also, or alternatively, the second storage means 220 is configured for storing data received from the numerical controller 310, the programmable logic controller 320 and the one or more NC registers 311, and/or the one or more PLC registers 320 via the first communication interface 330, the interface server module 410 of the second communication interface 400 and the interface client module 420a (or 420c as explained further below) of the second communication interface 400, and/or the second storage means 220 is configured for storing data received from the data block 430 in the one or more PLC registers 320 via the interface server module 410 of the second communication interface 400 and the interface client module 420a (or 420c as explained further below) of the second communication interface (400).

According to further embodiments of the invention, data access by the basic module application 211 and/or the one or more control applications 212a to 212g can be allowed or enabled as follows.

For example, the basic module application 211 executed on the second processing means 210 can be adapted to request data stored in the one or more NC registers 311 and/or the one or more PLC registers 320 by issuing control commands of the second interface language protocol and/or the second internal communication protocol to the interface client module 420a, which can then be adapted to transfer the control commands of the second interface language protocol and/or the second internal communication protocol to the interface server module 410.

Furthermore, the interface server module 410 can be adapted to convert the received control commands of the second interface language and/or the second internal communication protocol to corresponding control commands of the first interface language protocol, and to transfer the converted control commands of the first interface language protocol to the first communication interface 330, which can be adapted to request the corresponding data from the one or more NC registers 311 and/or the one or more PLC registers 320 upon receipt of the converted control commands of the first interface language protocol via the first communication interface 330 (or directly from the data block 430).

Alternatively or in addition to the above, one or more of the control applications 212a to 212g executed on the second processing means 210 can be communicably connected to the basic module application 211 (or possibly directly to one of the interface client modules 420a to 420c) and can be enabled to access data stored in one or more NC registers 311 and/or the one or more PLC registers 320 through the basic module application 211 as discussed above (or possibly directly through one of the interface client modules 420a to 420c).

Furthermore, the control applications 212a to 212g executed on the second processing means 210 can be communicably connected to the basic module application 211, and the basic module application 211 can be adapted to store result information and/or statistical information received from one or more control applications 212a to 212g into the second storage means 220.

Furthermore, one or more first control applications 212a to 212g of the plurality of control applications executed on the second processing means 220 can be adapted to observe data related to one or more second control applications 212a to 212g of the plurality of control applications 212a to 212g.

Furthermore, one or more first control applications of the plurality of control applications executed on the second processing means 220 can be adapted to modify data related to one or more second control applications of the plurality of control applications 212a to 212g.

The front-end control device 200 according to the first embodiment further comprises a first human-machine interface 250 being communicably connected to the operation unit 260 which combines the display unit 230 and the input unit 240, and including a first graphical user interface 251

(GUI) for controlling the one or more control screens displayed on the display unit 230 and for processing control input operations of the user via the input unit 240.

The first human-machine interface 250 is configured to provide a plurality of sets of user operable widgets, each user operable widget being operable by the user via the input unit 240. In the sense of the invention a user-operable widget is a user-operable application having a display widget part and an internal widget application part, wherein the display widget part represents a displayed portion of a control screen and a operable portion of the in input unit so that information related to the particular widget is presented to the user in the displayed portion and the user is enabled to operate or control the widget via the operable portion. On a touch screen, the displayed portion and the operable portion may be integrated partly or as a whole in a part of the control screen displayed on the touch screen.

The first graphical user interface 251 is further configured to control a plurality of first control screens displayed on the display unit 230 such that each first control screen includes a configuration of a respective set of user operable widgets. Moreover, since preferably one control screen (or a group of selected control screens) is displayed at a time, the first graphical user interface 251 is further configured to switch among one or more first control screens (or groups thereof) displayed on the display unit 230 on the basis of user input operations input via the input unit 240.

For example, the first graphical user interface 251 can be further configured to control displaying an application selection screen on the display unit having a set of user-operable application selection widgets, each application selection widget being adapted for enabling selection of one or more of the plural control applications by the user.

And, the first graphical user interface 251 can then be further configured to switch among the one or more first control screens (or groups thereof) displayed on the display unit 230 on the basis of user input operations input via the input unit 240 as selection input by selecting a specific first control screen (or control screen group) by operating the related application selection widget.

Specifically, the first graphical user interface 251 can be further configured to control, for each selected control application, displaying a respective application screen for the respective selected control application, each application screen including a set of application related user-operable widgets. Each application screen may include a selection screen widget for displaying the application selection screen on the display unit upon operation of the selection screen widget by the user.

The first graphical user interface 251 generally includes plural user-operable widgets 254 communicably connected to the basic module application 211 and/or to one or more interface client modules 420a and 420b. Furthermore, one or more of the widgets 254 can be adapted to access data in the second storage means 220 and the one or more PLC registers 321 and/or the one or more NC registers 311 via the basic module application (211), and/or the one or more widgets can be adapted to access data in the one or more PLC registers 321 and/or the one or more NC registers 311 via the one or more interface client modules 420a and 420b.

The front-end control device 200 according to the first embodiment further comprises a web server module 270 adapted to access data in the second storage means 220 directly or via the basic module application 211 and the one or more PLC registers 321 and/or the one or more NC registers 311 via the interface client module 420c or via the basic module application 211 and the interface client module 420b.

The web server module 270 can be adapted to generate web page data in a markup-language such as XML or HTML on the basis of the data in the second storage means 220, the one or more PLC registers 321 and/or the one or more NC registers 311 and provide such web page data to the storage means 220, to the basic module application 211 and/or to a first web browser module 280 communicably connected to the web server module 270.

In addition, the web server module 270 can be communicably connected to a computer network such as a LAN, SAN or the internet so as to receive and/or transmit web page data from/to computers of the network.

The first web browser module 280 is configured to process web page data received from the web server module 270 (either generated at the web server module 270 or received at the web server module 270 from the communication network), accessed from the storage means 220, or being received from the basic module application 211, and to generate image data to be displayed, for example, on the display unit 230, e.g., as part of a control screen or as additionally provided web page screens. The first web browser module 280 may be part of the first graphical user interface 251 or be connected to the first graphical user interface 251.

As mentioned further above, the second graphical user interface 341 of the back-end control device 300 is adapted for controlling at least one vendor-specific NC control screen (second control screen).

According to a preferred aspect of the first embodiment, the first graphical user interface 251 is further configured to control displaying either one or more first control screens as described above or a third control screen on the display unit 230. Specifically, the third control screen may be an application screen being selectable via the above-described application selection screen via a selection widget for selecting the third control screen.

Figure 8:
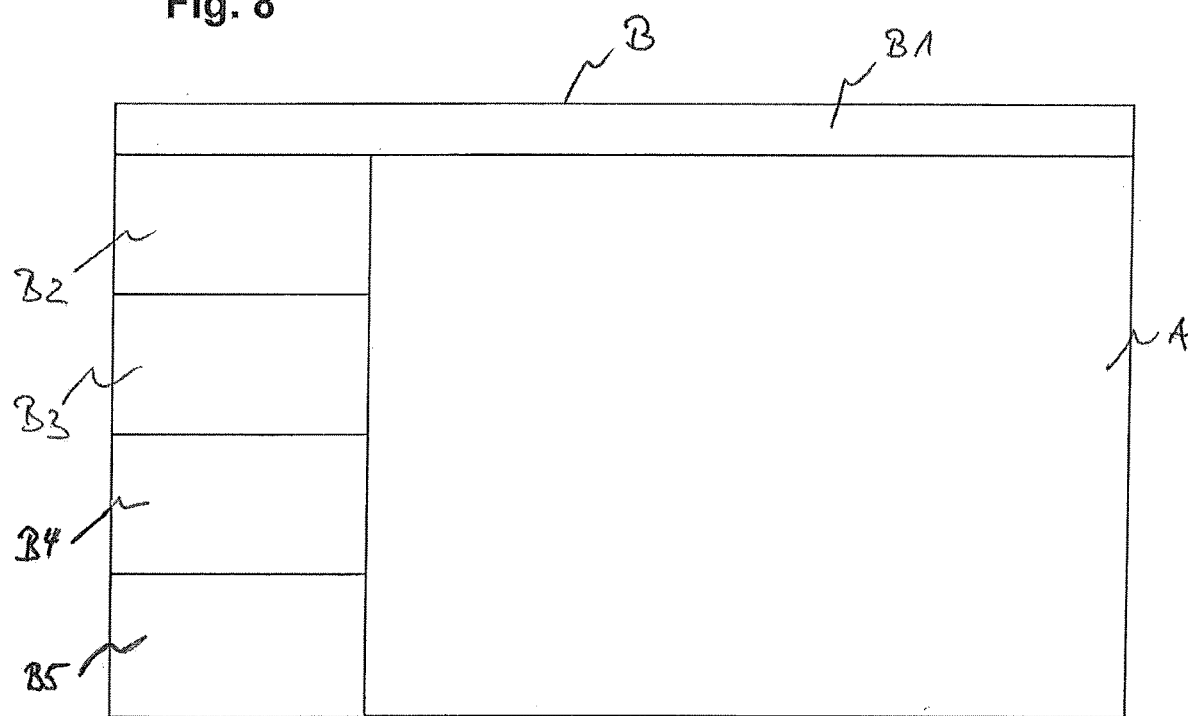
FIG. 8 shows an exemplary schematic configuration of third control screen according to an embodiment of the present invention.

FIG. 8 shows an exemplary schematic configuration of third control screen according to an embodiment of the present invention. According to the example, the third control screen B includes a display part A corresponding to the at least one second control screen (e.g. a native NC control screen of the NC 310 being CNC vendor-specific) provided by the second graphical user interface 341 of the back-end control device. In addition to the display part B in the third control screen corresponding to the at least one second control screen provided by the second graphical user interface 341, the first graphical user interface 251 can be configured to control the third control screen such that the third control screen further includes a configuration of a respective set of user operable widgets 254 provided by the first human-machine interface 250 in the additional display parts B1 to B5.

Exemplarily, the dimensions of the third control screen B may be 1920×1080 in units of pixels, and the display part A may have the dimensions 1280×1024. The display part B1 may have the dimensions 1920×56 and the remaining display parts B2 to B5 may have the dimensions 640×256 each. Especially the display parts B2 to B5 may contain user-operable widgets (e.g. touch-operable widgets in a touch screen part) for controlling functions of the machine tool and controlling monitoring functions of the machine tool. The display parts B2 to B5 may contain user-operable widgets (e.g. touch-operable widgets in a touch screen part) being associated with user-operable input means (such as buttons, keypads, softkeys etc.) of a NC vendor specific control panel being associated with the NC 310. Such NC vendor specific input means may be provided as a virtual touch operable keypad displayed in one or more of the display parts B2 to B5.

Accordingly, via the input unit 240 and the display unit 230, the user is enabled to access the one or more second control screens provided by the second graphical user interface 341 of the back-end control device 300 at the operation unit 260 of the front-end control device 200 via the first graphical user interface 251, providing the full functionality and operability of the second graphical user interface 341 to the user via the first graphical user interface 251, by having the option to further include additional machine tool operation, control and/or monitoring functionalities in that additional widgets which are only provided by the first graphical user interface 251 can be provided in addition to the operability of the second graphical user interface 340 by means of one or more third control screens. This has the advantage that the third control screens provided by the first graphical user interface 251 can include the unaltered second control screens (e.g. the screen A mentioned above) provided as by the second graphical user interface 340 and additional information and operability via additional widgets provided by the first graphical user interface 251 (e.g. in display parts B1 to B5 mentioned above).

In some embodiments, the basic module application 211 may be adapted to control a status control screen to be displayed by the graphical user interface 251 on the display unit 230 for providing status information on status indicating parameters and functions of the numerically controlled machine or machine tool, the basic module application 211 being adapted to retrieve parameter values from the NC 310 and the PLC 320 being associated with status parameters indicated and/or visualized on the status control screen.

In the first embodiment, the above is achieved in that an additional desktop sharing module 253 is provided in the first human-machine interface 250 of the front-end control device 200, the desktop sharing module 253 being communicably connected directly to the second human-machine interface 340 (specifically, for example, to the second graphical user interface 341).

Accordingly, by direct communication between the desktop sharing module 253 of the first human-machine interface 250 with the second human-machine interface 340, wherein the communication connection does not rely on the first or second communication interfaces 300 or 400, the human-machine interfaces 250 and 340 can communicate directly, or more specifically the first human-machine interface 250 can access the second human-machine interface 340.

Such desktop sharing module 253 (DSM or DS module) can be realized by a known desktop sharing system, for example, by means of Virtual Network Computing (VNC) according to which a VNC communication system has a VNC server (as an exemplary DS server module) and a VNC client (as an exemplary DS client module) communicating via a VNC protocol (as an exemplary DS protocol).

For example, the desktop sharing module 253 may have a DS client module and the second human-machine interface 340 may have a DS server module, communicating directly with the DS client module of the desktop sharing module 253 via a DS protocol without participation of any of the communication interfaces 300 and 400.

The basic module application 211 may represent a management application managing the control applications 212a to 212g installed at the front-end control device 200, managing removal of installed control applications or adding new control applications and related user-operable widgets. The basic module application 211 may further control data exchange between the control applications 212a to 212g among each other, between the control applications 212a to 212g and the storage means 220, between the control applications 212a to 212g and the NC 310 and the PLC 320, and/or between the control applications 212a to 212g and the graphical user interface 251.

In addition, the basic module application 211 may be adapted to manage downloading of control application data via the web browser 280 and the server module 270 and stored to the storage means 220, managing installing of newly downloaded control applications and related user-operable widgets, and adapting one or more control screens based on installed and/or newly installed control applications. The similar way, the basic module application may control updating of one or more control applications based on update data downloaded via the web server 280 and server module 270.

Accordingly, it is conveniently possible to provide new control applications later and/or update control applications later for plural machine tool control systems independent of the actual vendor of the vendor specific NC/PLC system, and install these within the environment of the operating system 213 independent of the vendor specific operating system 313 of the NC/PLC system and the vendor specific interface communication protocols of the NC/PLC system.

New control application data related to new control applications and/or update data for previously existing control applications may be downloaded via the web browser 280 and the server module 280 manually or automatically, e.g. from a database storage means 710 via a communication server module 720 as described for further embodiments below. In addition, new control application data related to new control applications and/or update data for previously existing control applications may be provided directly to the storage means 220, e.g. via wireless communication such as WLAN or Bluetooth, or via a USB port or other media drives such as DVD or CD of the front-end control device 200.

Second Embodiment

FIG. 2B shows an exemplary schematic configuration of a control system according to a second embodiment of the present invention.

The configuration of the second embodiment is similar to the configuration of first embodiment in large parts, and similar features, modules and/or units are labeled with the same reference numerals. Detailed description of similar features is omitted for reasons of conciseness and the below description is focused on differences between the first and second embodiments.

In contrary to FIG. 2A, in FIG. 2B the interface server module 410 is exemplarily provided in the front-end control device 200, whereas the interface server module 410 was exemplarily provided in the back-end control device 300 in FIG. 2A. In FIG. 2B, the interface server module 410 is internally connected to the interface client modules 420a to 420c on one side and externally connected to the NC-PLC-interface 330 of the back-end control device 300. The functions of the interface server module 410 are similar as in FIG. 2A.

Third Embodiment

Figure 3A:
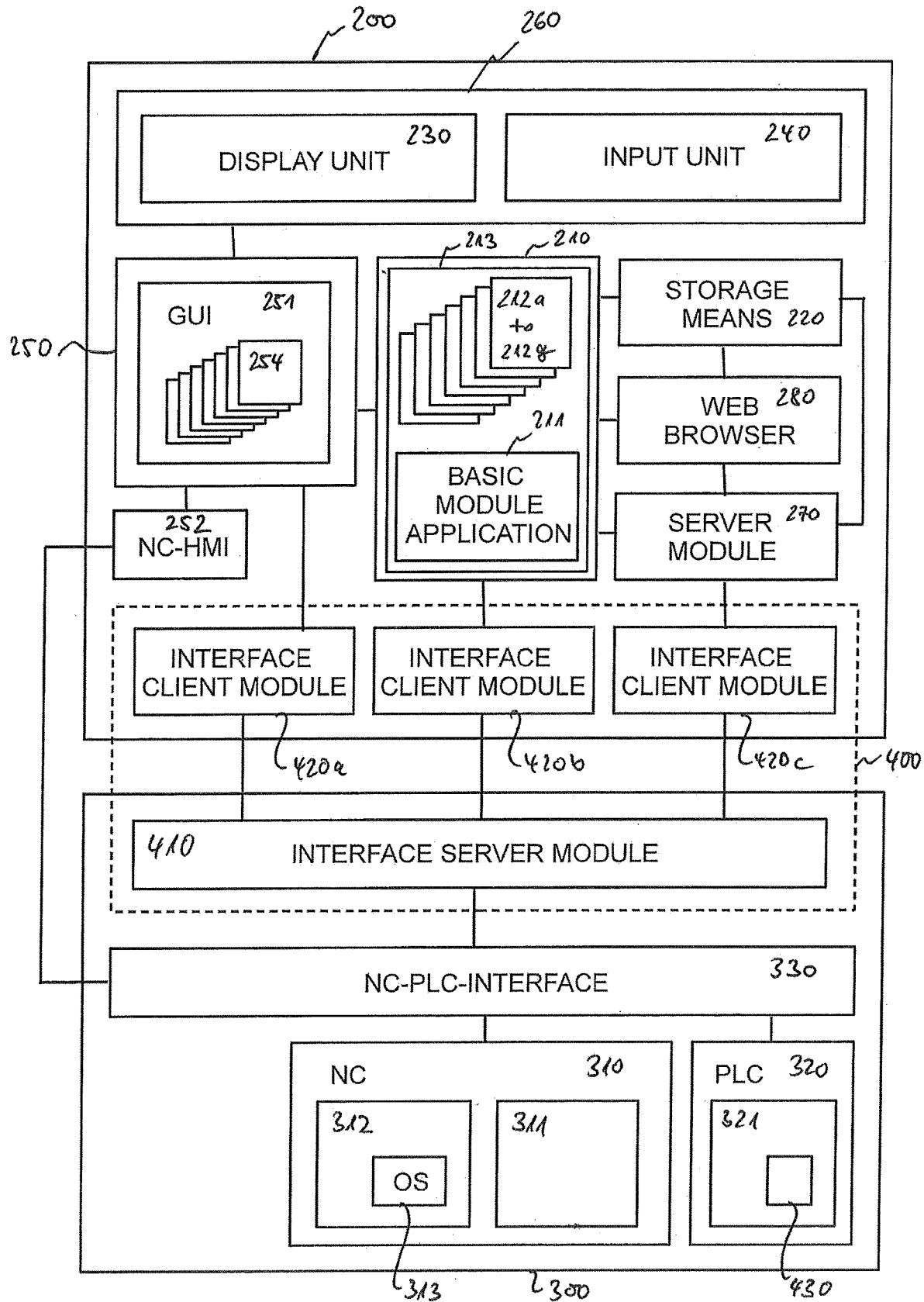
FIG. 3A shows an exemplary schematic configuration of a control system according to a third embodiment of the present invention.

FIG. 3A shows an exemplary schematic configuration of a control system according to a third embodiment of the present invention.

The configuration of the third embodiment is similar to the configuration of first embodiment in large parts, and similar features, modules and/or units are labeled with the same reference numerals. Detailed description of similar features is omitted for reasons of conciseness and the below description is focused on differences between the first and third embodiments.

Contrary to FIG. 2A, in FIG. 3A the second human machine interface (which may be a vendor-specific human machine interface of the vendor-specific NC/PLC control system parts of the back-end control device 300) or at least the second graphical user interface as described above is provided on the front-end control device 200 as NC-human-machine interface 252 (or NC-graphical user interface 252) being directly connected to the first communication interface 330 (similar to the human-machine interface 340 in FIG. 2A but provided on the front-end communication device 200). Still, even though the NC-human-machine interface 252 is exemplarily provided on the front-end control device 200, the communication between the NC-human-machine interface 252 and the first communication interface occurs without the participation of the second communication interface device via the first interface language protocol communication.

However, the NC-human-machine interface 252 is directly connected to the first human-machine interface 250 for providing the data relating to the second control screens to the first human-machine interface 250 for controlling displaying the third control screens. While the connecting may be a direct communication, it is further conceivable that the first human-machine interface 250 has a DS client and the NC-human-machine interface 252 has a DS server communicating with the DS client via a DS protocol (e.g. via VNC).

Fourth Embodiment

Figure 3B:
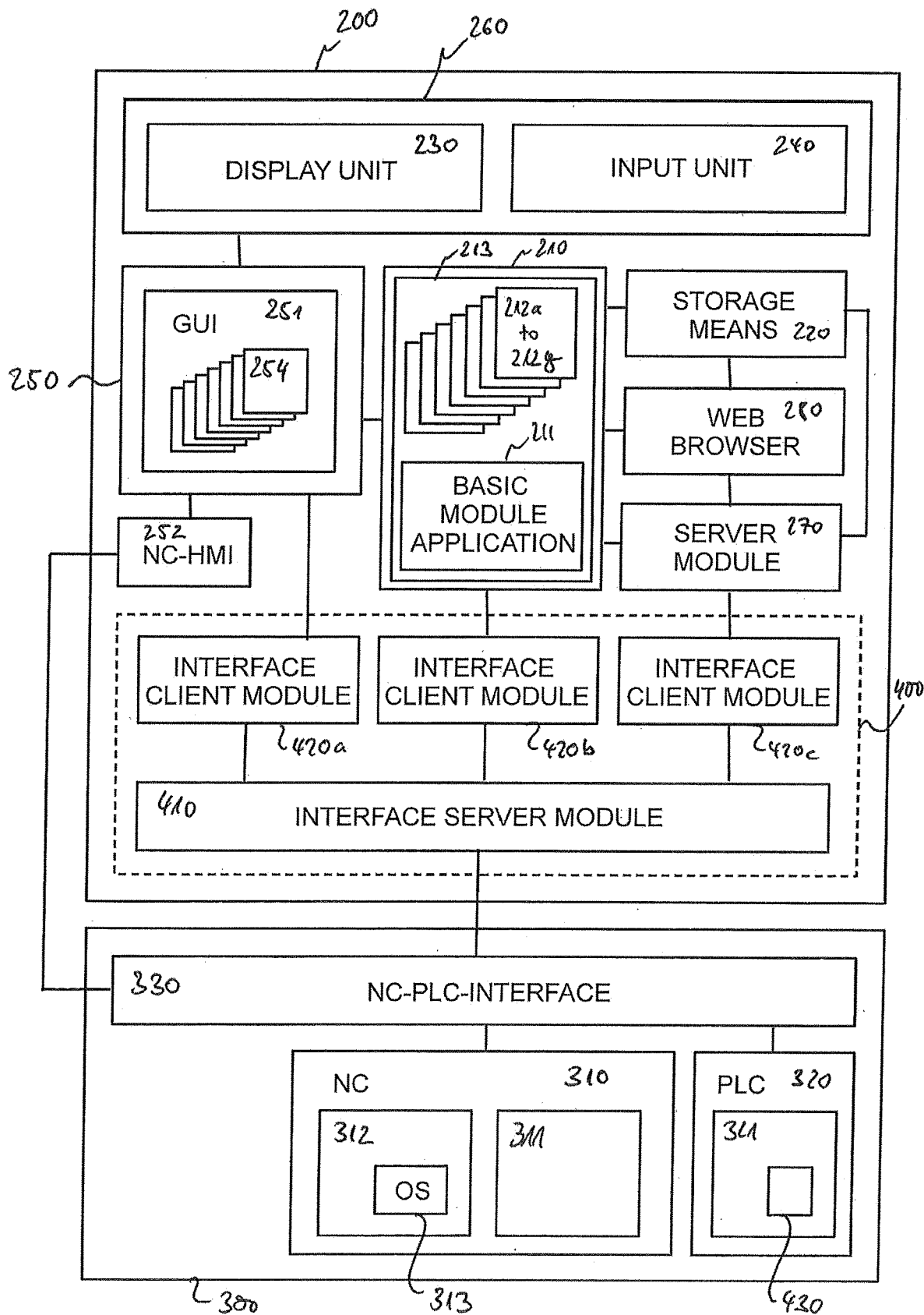
FIG. 3B shows an exemplary schematic configuration of a control system according to a fourth embodiment of the present invention.

FIG. 3B shows an exemplary schematic configuration of a control system according to a fourth embodiment of the present invention.

The configuration of the fourth embodiment is similar to the configuration of third embodiment in large parts, and similar features, modules and/or units are labeled with the same reference numerals. Detailed description of similar features is omitted for reasons of conciseness and the below description is focused on differences between the third and fourth embodiments.

In contrary to FIG. 3A, in FIG. 3B the interface server module 410 is exemplarily provided in the front-end control device 200, whereas the interface server module 410 was exemplarily provided in the back-end control device 300 in FIG. 3A. In FIG. 3B, the interface server module 410 is internally connected to the interface client modules 420a to 420c on one side and externally connected to the NC-PLC-interface 330 of the back-end control device 300. The functions of the interface server module 410 are similar as in FIG. 3A.

Fifth Embodiment

Figure 4:
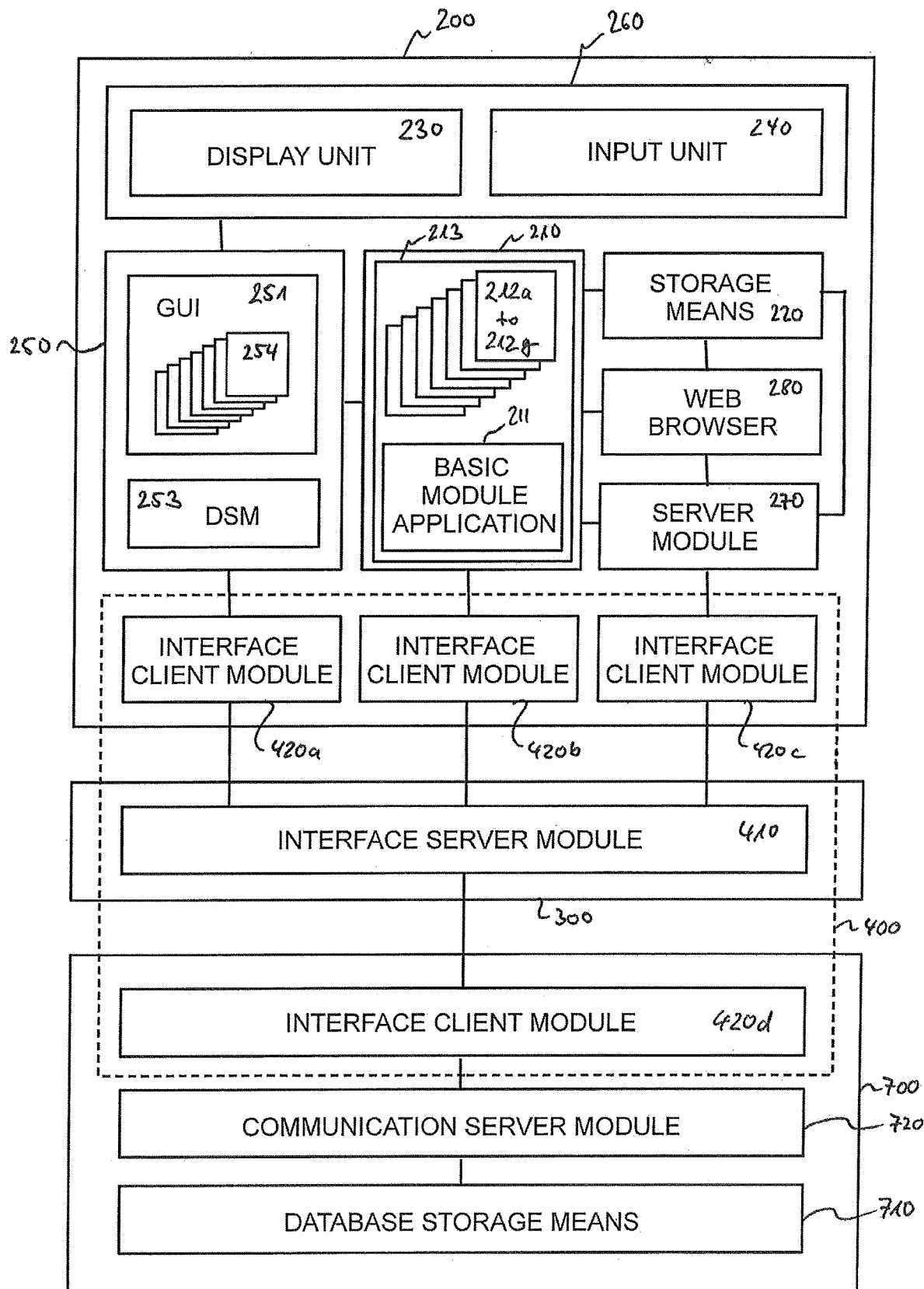
FIG. 4 shows an exemplary schematic configuration of a control system according to a fifth embodiment of the present invention.

FIG. 4 shows an exemplary schematic configuration of a control system according to a fifth embodiment of the present invention.

The configuration of the fifth embodiment is similar to the configuration of first embodiment in large parts, and similar features, modules and/or units are labeled with the same reference numerals. Detailed description of similar features is omitted for reasons of conciseness and the below description is focused on differences between the first and fifth embodiments.

Moreover, it is to be noted that the back-end control apparatus 300 according to the fifth embodiment can be realized similar to the back-end control apparatus 300 of FIG. 2A, even though the additional features thereof as shown in FIG. 2A are omitted in FIG. 4 for reasons of figure size only. Also, the fifth embodiment may be modified similar to the modification of the other embodiments as described above. Specifically, similar to FIGS. 2B and 3B, the interface server module 410 may alternatively be provided in the front-end control device 200.

According to FIG. 4, the control system further includes an external remote data collection device 700 comprising an interface client module 420d (which is itself configured similar to the interface client modules 420a to 420c discussed above) of the second communication interface 400 (indicated again by the dashed line) and being communicably connected to the database storage means (710) via a communication server module 720, and utilizing the second interface language protocol and being communicably connected to the interface server module 410 of the back-end control device 300 and being further configured to be connected with one or more further interface server modules 410 of one or more further back-end control devices 300 of other control systems of other machine tools 100.

Specifically, the communication server module 720 can access data in plural back-end control devices 300 of plural control systems of plural machine tools 100, as long as an interface server module 410 is provided in each of the connected control systems (e.g. if the control systems are respectively configured as in the embodiments described above).

Thus, the externally connected data collection device 700 is configured to access data in storage means (including one or more NC registers 311, one or more PLC registers 320 and/or one or more data blocks 430) of the one or more back-end control devices 300 via the interface client module 420d and the respective interface server modules 410 and first communication interface modules 330 of the respective back-end control devices 300, or in case of data blocks 430 directly via the interface client module 420d and the respective interface server modules 410 without participation of the first communication interface modules 330.

The data collection device 700 comprises the database storage means 710, for example, for storing data received from the one or more back-end control devices 300 via the interface client module 420d such as e.g. for storing history data about operation and/or control history of plural machine tools 100. Here, the data collection device 700 can be connected directly to plural control systems of plural machine tools at one factory site (e.g. the machine tools of one production line or the like). Alternatively, the data collection device 700 can be connected to plural control systems of plural machine tools located at plural factory sites (e.g. the machine tools of one production line or the like), for example via an internet connection, e.g. allowing for remote observation and maintenance monitoring of the plural machine tools located at plural factory sites.

Sixth Embodiment

Figure 5:
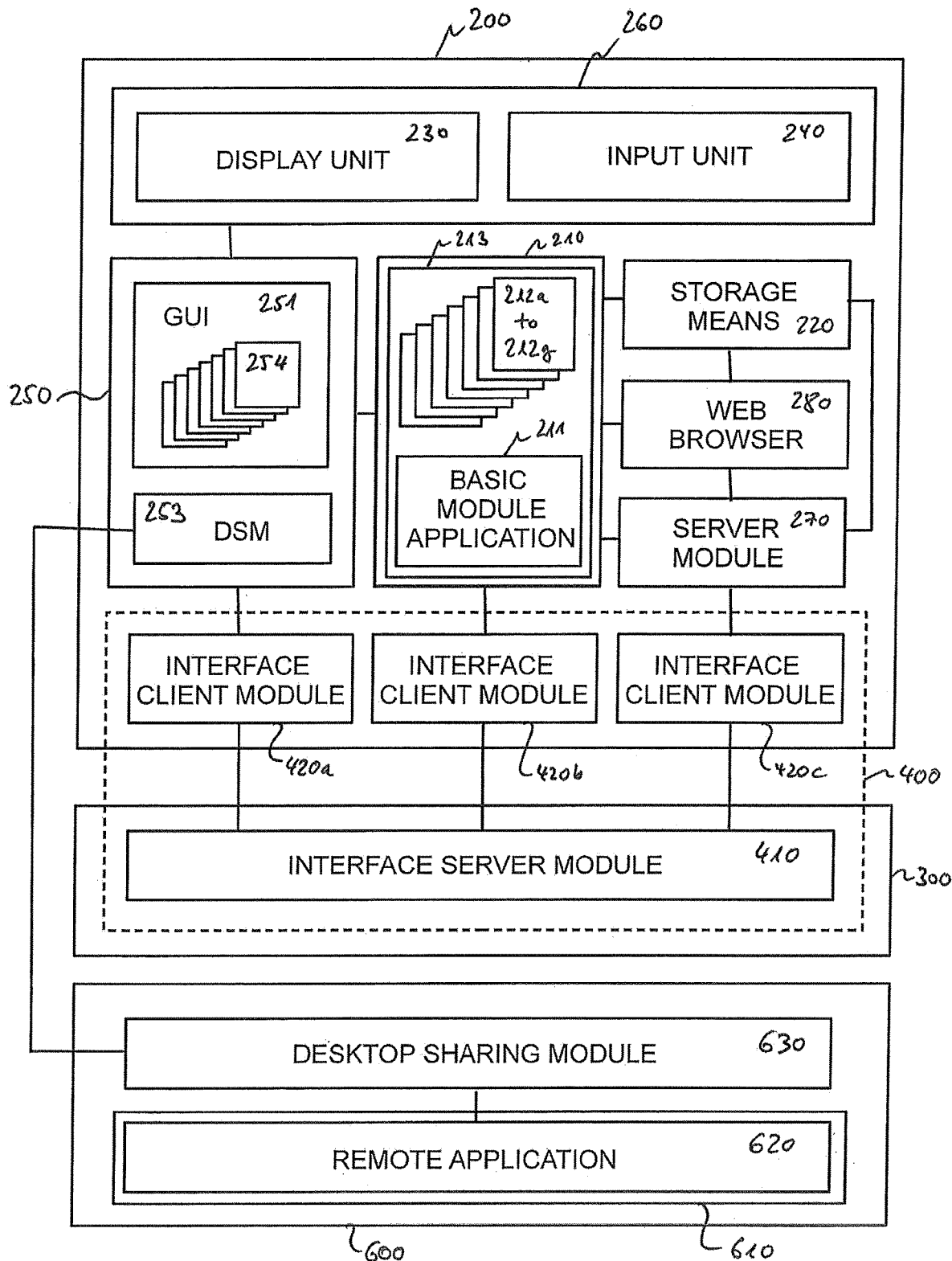
FIG. 5 shows an exemplary schematic configuration of a control system according to a sixth embodiment of the present invention.

FIG. 5 shows an exemplary schematic configuration of a control system according to a sixth embodiment of the present invention.

The configuration of the sixth embodiment is similar to the configuration of first embodiment in large parts, and similar features, modules and/or units are labeled with the same reference numerals. Detailed description of similar features is omitted for reasons of conciseness and the below description is focused on differences between the first and sixth embodiments.

Moreover, it is to be noted that the back-end control apparatus 300 according to the sixth embodiment can be realized similar to the back-end control apparatus 300 of FIG. 2A, even though the additional features thereof as shown in FIG. 2A are omitted in FIG. 5 for reasons of figure size only. Also, the sixth embodiment may be modified similar to the modifications of the other above embodiments according to the differences as described above, and the sixth embodiment may, for example, be modified by adding the additional features of the fifth embodiment described above. Also, similar to FIGS. 2B and 3B, the interface server module 410 may alternatively be provided in the front-end control device 200.

According to FIG. 5, the control system further includes a remote control device 600 which comprises a processing device 610 (such as one or more CPUs), a remote application 620 being executed in the processing device 610, and a third graphical user interface (such as a graphical user interface of an operation system of a personal computer or the like, e.g. on the basis of a window-based operation system such as Microsoft Windows or a Linux based window operation system such as KDE or the like) which exemplarily further has a desktop sharing module 630 which at least includes a DS server but may also include a DS client for desktop sharing, for example, according to the above-described VNC.

The remote application 620 may be represented by a software application providing CAD and/or CAM functionalities, and/or a software application providing virtual simulation functions for simulating operations of the machine tool 100. On the basis of the execution of the remote application 620 on the processing device 610, the third graphical user interface may be adapted to control one or more display screens or control screens which can be provided by means of the DS server of the desktop sharing module 630 to the human-machine interface 250 of the front-end control device 200 which has the desktop sharing module 253 having at least a DS client (or in that the GUI 251 or the HMI 250 has a DS client).

Specifically, the third graphical user interface may be adapted for providing one or more remote application screens on the basis of the execution of the remote application 620, wherein the third graphical user interface is communicably connected with the first graphical user interface 251 of the front-end control device 200 via the desktop sharing module 630. The first graphical user interface 251 then is adapted to control displaying the remote application screen on the first display unit 230 of the front-end control device 200 via a graphical desktop sharing system such as e.g. VNC.

Accordingly, by means of the connection to the remote control device 600 according to FIG. 5, the user/operator of the machine tool 100 can conveniently access the remote application 620 (such as CAD, CAM and/or virtual machine tool simulation applications) being executed on the processing means 610 via desktop sharing (e.g. via VNC) by means of the display unit 230 and the input unit 240 without forcing strong computational burden on the processing means 210 of the front-end control device 200.

Seventh Embodiment

Figure 6:
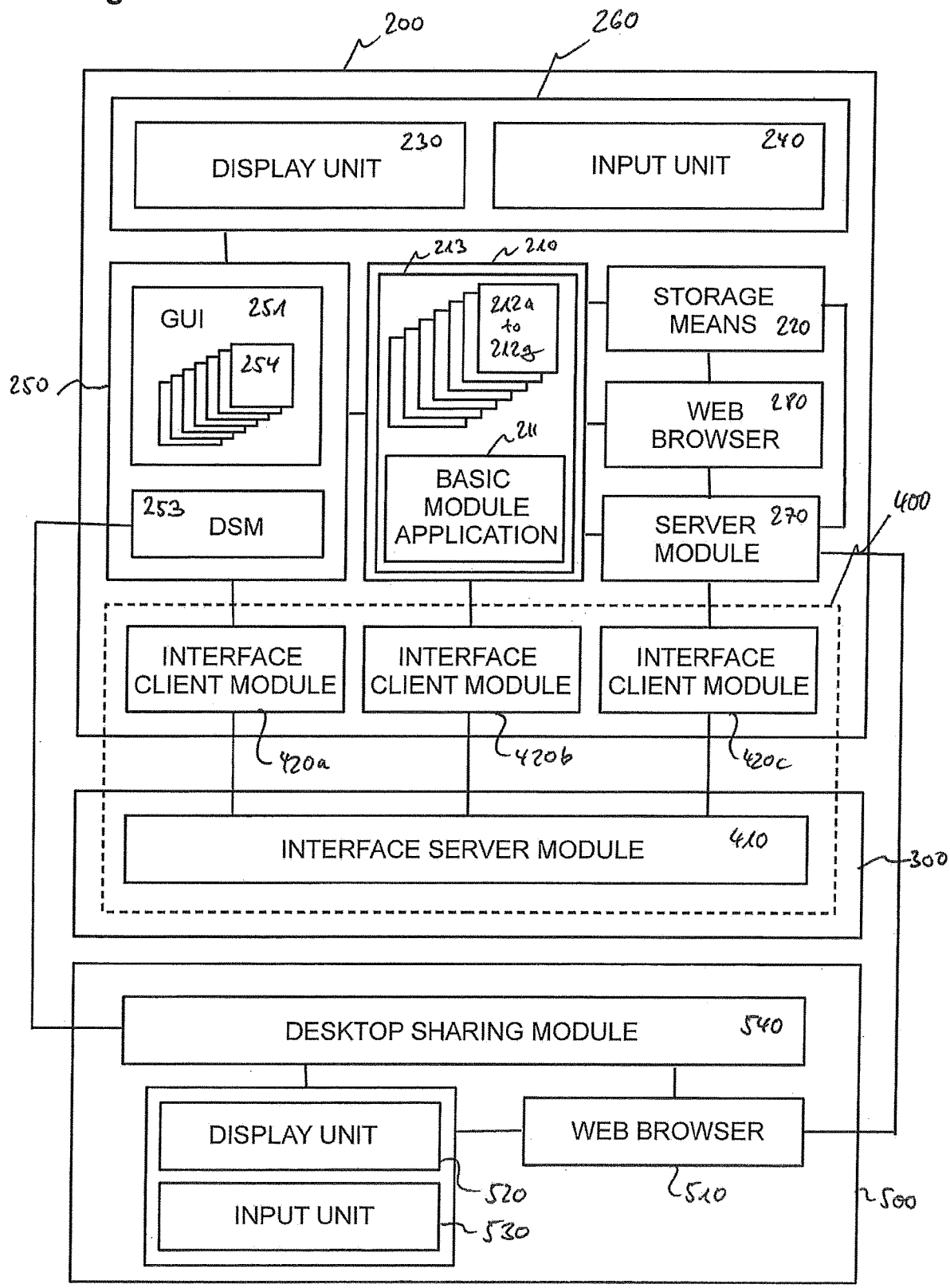
FIG. 6 shows an exemplary schematic configuration of a control system according to a seventh embodiment of the present invention.

FIG. 6 shows an exemplary schematic configuration of a control system according to a seventh embodiment of the present invention.

The configuration of the seventh embodiment is similar to the configuration of first embodiment in large parts, and similar features, modules and/or units are labeled with the same reference numerals. Detailed description of similar features is omitted for reasons of conciseness and the below description is focused on differences between the first and seventh embodiments.

Moreover, it is to be noted that the back-end control apparatus 300 according to the seventh embodiment can be realized similar to the back-end control apparatus 300 of FIG. 2A, even though the additional features thereof as shown in FIG. 2A are omitted in FIG. 6 for reasons of figure size only. Also, the seventh embodiment may be modified similar to the modification of the other embodiments according to the differences as described above, and the seventh embodiment may, for example, be modified by adding the additional features of the fifth and/or sixth embodiments described above. Also, similar to FIGS. 2B and 3B, the interface server module 410 may alternatively be provided in the front-end control device 200.

According to FIG. 6, the control system further includes a remote control device 500 (which may additionally have one or more of the features of the remote control device 600) which comprises a second display unit 520 for displaying one or more control screens to a user and a second input unit 530 for receiving control input operations from the user, a second web browser module 510, and a human-machine interface including at least a desktop sharing module 540 which at least includes a DS client but may also include a DS server for desktop sharing, for example, according to the above-described VNC.

The human-machine interface of the remote control device 500 may include a graphical user interface of an operation system of a personal computer or the like, e.g. on the basis of a window-based operation system such as Microsoft Windows or a Linux based window operation system such as KDE or the like, or of an operation system for mobile devices such as e.g. Windows-based, Linux-based, Android-based, or Apple-OS-based mobile phones (e.g. smart-phones) or tablets having touch operability.

Connection of the remote control device 500 with the front-end control device 200 can be realized by wired or wireless connections, wherein if the remote control device 500 is embodied by a mobile device such as a notebook personal computer, a smartphone or a tablet with touch operability, the connection is preferably established wirelessly via WiFi, Bluetooth, or other wireless communication technologies such as UMTS or LTE.

The second web browser module 510 can be adapted to communicably connect to the to the web server module 270 of the front-end control device 200 and to access the second storage means 220 and the basic module application 211 of the front-end control device 200 via the web server module 270, and/or to access the PLC and/or NC registers 321 and 311, the numerical controller 310 and the programmable logic controller 320 of the back-end control device 300 via the web server module 270, the interface client module 420c, the interface client server 410, and the first communication interface 330, and/or to access the PLC data block 430 via the web server module 270, the interface client module 420c, and the interface client server 410.

Furthermore, the second display unit 520 can be configured to display the one or more control screens provided by the first graphical user interface 251 via a graphical desktop sharing system by connection of the DS client of the desktop sharing module 540 and the DS server of the desktop sharing module 253 of the first human-machine interface 250.

Accordingly, by means of the connection to the remote control device 600 according to FIG. 6, the user/operator of the machine tool 100 can conveniently monitor, operate and/or control the machine tool 100 via the functions provided by the first graphical user interface 251 by means of a remotely connected remote control device 600 and the display unit 520 and the input unit 530 thereof (which may be integrated into a touch screen, especially for smartphones or tablets) via desktop sharing (e.g. via VNC) without forcing strong computational burden on the processing means of the remote control device 600.

Eighth Embodiment

Figure 7:
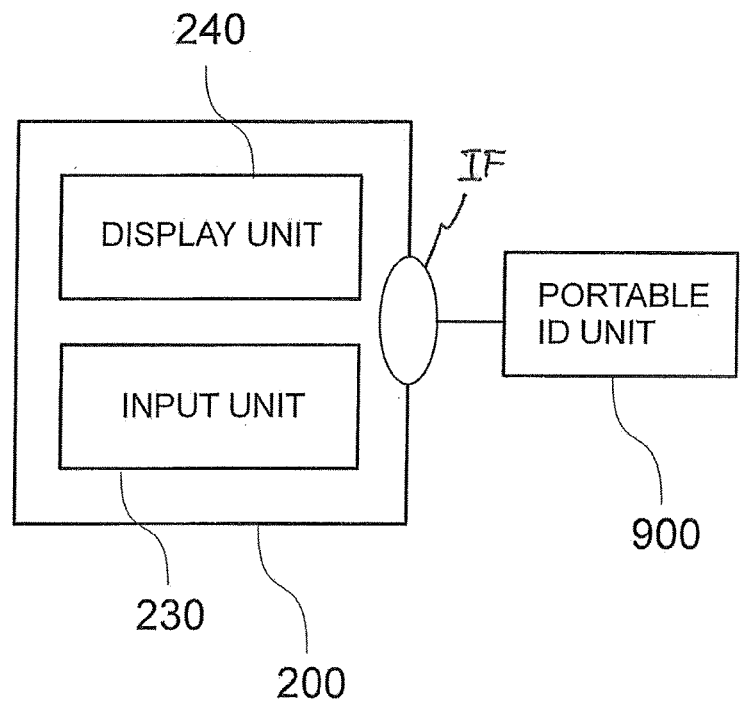
FIG. 7 shows an exemplary schematic configuration of a control system according to an eighth embodiment of the present invention.

FIG. 7 shows an exemplary schematic configuration of a control system according to an eighth embodiment of the present invention. In FIG. 7, a portable ID unit 900 is connected to the front-end apparatus 200 via an interface IF.

The communication interface IF may be a wired or wireless communication interface IF, including interfaces such as Ethernet, USB, Wireless LAN (WiFi), RFID etc. The portable ID unit 900 may be a portable unit associated to a particular user of a machine tool and is configured to store user data of the particular user, the user data including at least a user ID uniquely identifying the particular user, access level data indicating an access level of the particular user and/or operation mode data indicating one or more operation modes that shall be available for selection by the user.

When the portable ID unit 900 is connected to the front-end control device 200, the basic module application 211 is adapted to identify the user by means of the received user data and to determine an assigned access level of the particular user and/or one or more operation modes available to the particular user. The access level may be associated with one or more operation/control modes of the machine tool to be controlled. Then, the basic module application 211 is adapted to provide control application functionality to the identified user on the basis of the determined access level and/or the one or more operation modes available to the particular user.

For example, in case the determined access level of the user indicates that the user is only allowed to operate or control the machine tool at a limited access level (in which some control options shall not be available to the user), the basic module application 211 may control the first human-machine interface 250 so as to provide only a limited set of control screens to the user based on the determined access level and/or based on the one or more operation modes available to the particular user (i.e. one or more control screens cannot be selected by the user, and shall not be provided to the user), to provide, in a control application selection screen as described further above, only a limited set of application selection widgets to the user based on the determined limited access level and/or based on the one or more operation modes available to the particular user (i.e. one or more control applications cannot be selected by the user, and shall not be provided to the user), and/or to provide, in a control application screen being associated with a specific control application, only a limited set of user-operable application widgets to the user based on the determined limited access level and/or based on the one or more operation modes available to the particular user.

Control Application Examples

In the following, different examples of control applications are described which may be managed by the basic module application 211, and which may retrieve data from external storage means, storage means of the front-end and back-end control devices and the NC and PLC registers based on the interface structure as described above.

Status Monitor Application: A status monitor application may automatically be provided by the human-machine interface 250 including a display status monitor to be displayed by the display unit 230 when no user is logged into the system (e.g. when no portable ID device 900 is connected) as soon as the input unit 240 is not operated for a predetermined period of time. The status monitor may include a user-operable widget for selecting a control application selection application as described below.

The status monitor may indicate one or more of the following information: date and time; information on a user that is logged in (including name, access level, and/or available operation modes etc.); and information related to the operation and control of the machine tool including one or more of a name of an NC program being currently executed at the machine tool in each channel, a machining job progress information indicating an elapsed time and remaining time for a currently processed NC program (e.g. as a job progress in percent, a job progress bar indicating the machining job progress and/or a remaining job time and expected completion time of a currently processed machining job or currently executed job batch), a machining job batch progress information indicating numbers of produced parts and remaining parts of the currently processed job batch, a time until expected completion of the currently processed job batch and/or a progress bar showing the job batch progress in percent, axis positions and/or axis load of the main feed axes and/or rotary axes of the machine tool in each channel, a load factor (e.g. in percent) of a maximally allowed spindle vibration and/or a maximally allowed spindle motor power for one or more spindles of the machine tool in each channel. In addition, in case of detected shortage of raw material, a display part of the status monitor may indicate the amount of remaining raw material or a time period until raw material (such as bars loaded from a bar loader to a lathe, or raw workpieces supplied from a pallet to a milling machine, machining center or universal machine tool) run short. In addition, the status monitor may indicate a shortage of tools and show all of the tools stored in an associated tool magazine for which an end-of-lifetime warning limit is reached, and for critical tools, a remaining lifetime may be indicated.

In addition to the above, the status monitor may be adapted to display system warnings including regular HMI, PLC or NC alarms (as submitted from the NC 310 or the back-end unit 300) as well as other alarms that may be signaled from the NC cycle. States of the machine tool in which a system warning may be displayed on the status monitor includes one or more of: a coolant circuit signals a low or nearly insufficient pressure, a hydraulics circuit signals a low or nearly insufficient pressure, a lubricant circuit signals a low or nearly insufficient pressure, there is detected a shortage of raw material (e.g. end of bar material in case of a bar loader provided at a lathe), there is detected a shortage of tools (e.g. when the tools stored in a tool magazine provided for the machine tool have reached an end-of-lifetime), when it is detected that a cycle is cancelled or stopped, when feed hold is activated, when the chip conveyor signals an increased load, when axis coolant sensors signal a critical temperature, when a low pressure or low forces are detected in a chuck or a correct clamping signal is not signaled, when a laser system is active, when inert gas runs on low pressure or at an inadequate flow rate in a laser, when a pallet changer has an error occurrence or shows an opened door, and when a service interval has been hit and a machine check is required.

In addition, the status monitor may indicate information on consumed or recovered power in terms of the spindle and feed drives, e.g. as numerical values, numerical ticks/units or also as a graphical representation of the power flow. In the latter case, the display may be scaled to 100% of the sum of the nominal power of spindle and feed drives in positive (i.e. power consuming) direction, and, in negative (i.e. power emitting) direction, it may be scaled to 50% of the sum of the nominal powers of feed axes and spindles.

All of the above status monitor information may be retrieved via the basis module application 211 or directly via an associated interface client module 420 from the NC 310 or the PLC 320 or from the storage means 220, or be calculated on the basis of information retrieved via the basis module application 211 or directly via an associated interface client module 420 from the NC 310 or the PLC 320 or from the storage means 220.

The status monitor may also comprise a user-operable widget for executing the control application selection application described below, for displaying a control application selection screen.

Control Application Selection Application: A control application selection application may automatically be provided by the human-machine interface 250 including a control application selection screen to be displayed by the display unit 230 allowing the user to select among a set of available control applications (including the status monitor application and one or more control applications as discussed below).

For example, the control application selection screen may comprise a set of user-operable application selection widgets or a limited set of user-operable application selection widgets (depending on an access level of the user and/or one or more operation modes available to the user), each user-operable application selection widget being associated with a control application available to the user. Upon operating one of the user-operable application selection widgets, the basic module application 211 is adapted to manage execution of the selected control application.

Machining Job Assistant Application: A machining job assistant application may be provided for selecting one or more NC programs stored in the storage means 220 or in all other storage systems connected to the front-end device 200 (including storage means of the back-end device 300 and all other connected devices of above described embodiments). If a stored NC program or a stored job list of plural NC programs is selected, the machining job assistant application is adapted to process the selected NC program or selected job list of plural NC programs and related data stored in storage means for additional information including identifying a finished part and retrieving image data showing the finished part (e.g. a 2D view of the final part and/or a 3D CAD based model of the final part), identifying a list of tools required for manufacturing the final part based on the selected NC program or selected job list of plural NC programs and checking a list of stored tools of a tool magazine whether one or more required tools may be missing and for generating data indicating a list of missing tools, retrieving information indicating a fixture type, name or picture, and retrieving numerical offset points. Then, the machining job assistant application may be adapted to provide such additional information related to the selected NC program or selected job list of plural NC programs.

Machining Job Assistant Application: A machining job editor application may be adapted to enable a user to create and configure machining jobs, and to manually modify information required for the above-described machining job assistant application, and to create or modify configuration data or code data of a selected NC program or a selected job list of plural NC programs.

Native NC Control Application: A native NC control application may be enabled to manage the human machine interface 250 such as to display a third control screen as discussed above, the third control screen containing a native control screen of the human-machine interface of the native NC 310 (vendor specific), thereby simulating the graphical user interface of the human-machine interface of the native NC 310 of the back-end device 300 at the front-end device 200 and providing the operation and control functionalities of the graphical user interface of the native NC 310 to the user via the graphical user interface of the human-machine interface 250.

In addition, further monitoring and control operability may be provided in further screen parts (such as screen parts B1 to B5 described above) being respectively managed by extension applications (including user-operable widgets) for providing background information on current jobs, processes or machine conditions. Such extension applications may include an system load monitoring application for indicating a system load such as a load on system resources such as CPU usage or free NC storage place, a NC teaching application for teaching positions for quick semi-manual programming of NC programs, a handling monitoring application for monitoring machine handling indicating resting phases and interruption times, a user ID application for providing user ID data indicating user data related with a current user (e.g. name, available operation modes, access level etc.), an operation mode warning application for providing user warnings in case of critical operation modes (e.g. operation modes allowing for operations with opened doors), a drive load monitoring application for indicating a load on one or more axes of the machine tool (in terms of bars, graphs or numerical values), a diagnostics application, indicating diagnostics data retrieved from diagnostics sensors, and a job monitoring application for indicating numbers of parts produced and/or parts to be produced in a current job batch including processing times and remaining job batch times.

Setting Calculation Application: A setting calculation application is adapted to provide setting calculation functionalities to a user for executing mathematical calculations for setting up machining jobs including the calculation and checking of angles and distances, including algorithms for calculating and checking fit tolerances on bore holes and shafts. The setting calculation application may further provide functionalities for calculating data for process optimized parameters relating to spindle motor speed, spindle load and feeding speeds.

Cutting Condition Calculation Application: A cutting condition calculation application is adapted to provide cutting condition calculation algorithm functionalities for supporting users in setting up jobs. After selecting a tool type and upon input of parameters relating to geometrical data (e.g. tool length, tool diameter, etc.) and a maximum allowed process force by the user via a graphical user interface of the human-machine interface 250, the cutting condition calculation application is adapted to calculate recommended spindle speed and feed speed rates. If spindle speed and feed speed rates are input by the user, the cutting condition calculation application is adapted to calculate expected resulting process forces in order to check whether the input is feasible for a selected tool.

User Configuration Application: A user configuration application is adapted to manually configure user configurations including: showing a list of all users registered for the specific machine tool including user ID, registration code, maximum operation mode, maximum access level, reduced access level, comments, and a mark whether a portable ID device of a user is currently attached; newly registering users, deleting registrations of users, editing registrations of users; exporting and importing user registration data via a data interface such as Bluetooth, Ethernet, USB or wireless LAN from/for other machine tools.

Energy Saving Application: An energy saving application is adapted to enable a user to configure machine shutdown settings of a machine tool including settings such as a set period with no user interaction after which working room lights of the machine tools are automatically shut down, and a set period of non-productive time after which the machine is automatically brought in a standby mode.

Netservice Application: A netservice application enabling direct communication from the control panel of the machine tool with a support service center for direct remote support by service personal (e.g. via an external device as described in connection with FIG. 6, or also one of FIG. 4 or 5). Service personal may then perform technical support, monitoring and error diagnosis via the remote communication connection (e.g. via the Internet).

CAD-CAM-View Application: A CAD/CAM view application is adapted to connect to en external device for executing remote applications on the external device (such as a remote CAD/CAM-Workstation) via desktop sharing (e.g. as explained in connection with the embodiment of FIG. 5). Such external applications may include CAD applications, CAM applications, CAD/CAM applications, NC program generation applications and machine tool simulation applications, so that a user can remotely operate and control, at the control panel of the machine tool, machining related applications on a remote device (e.g. for remotely modifying, checking and adapting 3D models of final parts, remotely generating NC programs, or remotely simulating a job process at a virtual machine tool via a remote machine tool simulation application).

Digital Library Application: A library application may be adapted to provide plural documents to the user including process manuals, machine tool manuals, maintenance manuals, accessories manuals, process documents and customer data. Functionalities may additionally include automatic keyword search in the provided documents.

Organizer Application: An organizer application may be adapted to provide user individual calendar functions, memo functions, email functions and messenger functions.

Features, components and specific details of the structures of the above-described embodiments may be exchanged or combined to form further embodiments optimized for the respective application. As far as those modifications are readily apparent for an expert skilled in the art they shall be disclosed implicitly by the above description without specifying explicitly every possible combination, for the sake of conciseness of the present description.

The invention claimed is:

1. A control system for controlling operation of a numerically controlled machine tool, the system comprising:
a back-end control device; and
a front-end control device communicably connected to the back-end control device,
wherein the back-end control device comprises:
a numerical controller ("NC"),
a programmable logic controller ("PLC"),
a first memory for storing data, the first memory comprising one or more PLC registers of the programmable logic controller and one or more NC registers of the numerical controller,
at least one first processor for executing a first operating system on the basis of data stored in the first memory, and
a first communication interface (i) utilizing a first interface language protocol and an internal NC/PLC communication protocol, (ii) being communicably connected directly to the numerical controller, (iii) being communicably connected directly to the programmable logic controller, (iv) being communicably connected to the first memory by way of the internal NC/PLC communication protocol, and (v) being configured to convert between the internal NC/PLC communication protocol and the first interface language protocol which is utilized by the first communication interface;
wherein the back-end control device or the front-end control device comprises:
an interface server module of a second communication interface utilizing a plurality of interface language protocols, including the first interface language protocol and a second interface language protocol, and being communicably connected to the first communication interface by way of the first interface language protocol,
the interface server module being configured to convert between the first interface language protocol and one or more other interface language protocols of the plurality of interface language protocols, including interface language conversion from the first interface language protocol to the second interface language protocol and from the second interface language protocol to the first interface language protocol; and
wherein the front-end control device comprises:
one or more interface client modules of the second communication interface utilizing the second interface language protocol and/or a second internal communication protocol, and being adapted to communicably connect to the interface server module of the second communication interface by way of the second interface language protocol,
at least one second processor for executing a second operating system, a basic module application, and a plurality of control applications,
the at least one second processor, by executing the basic module application, being adapted to access data stored in the first memory via the one or more interface client modules of the second communication interface, the interface server module of the second communication interface and the first communication interface,
a second memory for storing data received from the numerical controller, the programmable logic controller and the first memory via the first communication interface, the interface server module of the second communication interface and the one or more interface client modules of the second communication interface,
a display for displaying one or more control screens to a user, and
a first human-machine interface being communicably connected to the display, and including a first graphical user interface for controlling the one or more control screens displayed on the display and for processing control input operations of the user.

2. The control system according to claim 1, wherein the at least one second processor, by executing the basic module application, is adapted to request data stored in the first memory by issuing control commands of the second interface language protocol and/or the second internal communication protocol to the one or more interface client modules, which are adapted to transfer the control commands of the second interface language protocol and/or the second internal communication protocol to the interface server module.

3. The control system according to claim 2, wherein the interface server module is adapted to convert the received control commands of the second interface language and/or the second internal communication protocol to corresponding control commands of the first interface language protocol, and to transfer the converted control commands of the first interface language protocol to the first communication interface, which is adapted to request corresponding data from the first memory upon receipt of the converted control commands of the first interface language protocol.

4. The control system according to claim 1, wherein the at least one second processor, by executing the basic module application, is adapted to control retrieval of new control application data and update data via one or more communication interfaces and/or data interfaces of the front-end control device, and to control installation of one or more new control applications on the basis of the retrieved new control application data and to control updating of one or more existing control applications based on the retrieved update data.

5. The control system according to claim 1, wherein the at least one second processor, by executing the plurality of control applications, is adapted to access data stored in the first memory through the basic module application,
the at least one second processor, by executing the basic module application, is adapted to store result information and/or statistical information received from one or more control applications into the second memory,
the at least one second processor, by executing one or more first control applications of the plurality of control applications, is adapted to observe data related to one or more second control applications of the plurality of control applications, and/or
the at least one second processor, by executing the one or more first control applications of the plurality of control applications, is adapted to modify data related to the one or more second control applications of the plurality of control applications.

6. The control system according to claim 1, wherein the first human-machine interface is configured to provide a plurality of sets of user operable widgets, each user operable widget being operable by the user,
the first graphical user interface is configured to control a plurality of first control screens such that each first control screen includes a configuration of a respective set of user operable widgets, and
the first graphical user interface is configured to switch among one or more of the first control screens displayed on the display on the basis of user input operations.

7. The control system according to claim 1, further comprising:
a second human-machine interface adapted to communicably connect to the first communication interface and the first human-machine interface, and including a second graphical user interface for controlling at least one second control screen,
the first graphical user interface being further configured to control displaying either one or more first control screens or a third control screen on the display,
wherein the third control screen includes a part corresponding to the at least one second control screen provided by the second graphical user interface.

8. The control system according to claim 7, wherein the first graphical user interface is configured to control the third control screen such that the third control screen further includes a configuration of a respective set of user operable widgets provided by the first human-machine interface.

9. The control system according to claim 7, wherein the second graphical user interface is in the front-end control device and is executed by the at least one second processor; or
the second graphical user interface is in the back-end control device and is executed by the at least one first processor, and the first and second graphical user interfaces are communicably connected via a graphical desktop sharing system.

10. The control system according to claim 1, wherein the first graphical user interface is further configured to control displaying on the display an application selection screen having a set of user-operable application selection widgets, each application selection widget being adapted for enabling selection of one or more of the plural control applications by the user; and/or
the first graphical user interface is further configured to control, for each selected control application, displaying a respective application screen for the respective selected control application, each application screen including a set of application related user-operable widgets.

11. The control system according to claim 1, wherein the display is integrated into an operation unit comprising a touch user interface including a touch pad or touch screen.

12. The control system according to claim 1, wherein the first graphical user interface includes one or more user-operable widgets communicably connected to the at least one second processor executing the basic module application and/or to one or more interface client modules; and/or
the one or more widgets are adapted to access data in the first and second memories via the at least one second processor executing the basic module application, and/or
the one or more widgets are adapted to access data in the first storage memory via the one or more interface client modules.

13. The control system according to claim 1, wherein the front-end control device further comprises a web server module adapted to access data in the first memory via the one or more interface client modules.

14. The control system according to claim 13, further comprising
a first remote control device including:
a second web browser module, and
a second display for displaying one or more control screens to a user,
wherein the second web browser module is adapted to communicably connect to the to the web server module of the front-end control device and to access the second memory and the basic module application of the front-end control device via the web server module, and to access the first memory, the numerical controller and the programmable logic controller of the back-end control device via the web server module, the one or more interface client modules, the interface client server and the first communication interface, and wherein the second display is configured to display the one or more control screens provided by the first graphical user interface via a graphical desktop sharing system.

15. The control system according to claim 1, further comprising
 a second remote control device including:
  at least one third processor configured to execute a remote application, and
  a third graphical user interface for providing a remote application screen on the basis of the execution of the remote application by the at least one third processor,
 wherein the third graphical user interface is communicably connected with the first graphical user interface of the front-end control device, and
 the first graphical user interface is adapted to control displaying the remote application screen on the first display of the front-end control device via a graphical desktop sharing system.

16. The control system according to claim 1, further comprising
 a data collection device comprising an interface client module communicably connected to a database memory, utilizing the second interface language protocol, and being communicably connectable with the one or more interface server modules of one or more of the back-end control devices,
 the data collection device being configured to access data in the first memories of the one or more back-end control devices via the interface client module and the respective interface server modules and first communication modules of the respective back-end control devices,
 wherein the database memory is adapted to store history data received from the one or more back-end control devices via the interface client module.

17. A back-end control device for use in a control system for controlling operation of a numerically controlled machine tool, the back-end control device comprising:
 a numerical controller ("NC");
 a programmable logic controller ("PLC");
 a first memory for storing data, the first memory comprising one or more PLC registers of the programmable logic controller and one or more NC registers of the numerical controller;
 at least one first processor for executing a first operating system on the basis of data stored in the first storage memory;
 a first communication interface (i) utilizing a first interface language protocol and an internal NC/PLC communication protocol, (ii) being communicably connected directly to the numerical controller, (iii) being communicably connected directly to the programmable logic controller, and (iv) being communicably connected to the first memory by way of the internal NC/PLC communication protocol; and
 an interface server module of a second communication interface utilizing a plurality of interface language protocols including the first interface language protocol and a second interface language protocol, and being communicably connected to the first communication interface by way of the first interface language protocol,
 the first communication interface being configured to convert between the internal NC/PLC communication protocol and the first interface language protocol which is utilized by the first communication interface, and
 the interface server module being configured to convert between the first interface language protocol and one or more other interface language protocols of the plurality of interface language protocols, including interface language conversion from the first interface language protocol to the second interface language protocol and from the second interface language protocol to the first interface language protocol.

* * * * *